March 31, 1953 W. W. CARPENTER ET AL 2,633,502

MECHANICAL COMMUNICATION SWITCHBOARD

Filed April 26, 1949

13 Sheets-Sheet 1

INVENTORS W. W. CARPENTER
P. B. MURPHY
BY John E. Cassidy
ATTORNEY

March 31, 1953 W. W. CARPENTER ET AL 2,633,502

MECHANICAL COMMUNICATION SWITCHBOARD

Filed April 26, 1949 13 Sheets-Sheet 2

INVENTORS W. W. CARPENTER
P. B. MURPHY
BY John E. Cassidy
ATTORNEY

MECHANICAL COMMUNICATION SWITCHBOARD

Filed April 26, 1949 13 Sheets-Sheet 3

INVENTORS W. W. CARPENTER
P. B. MURPHY
BY John E. Cassidy
ATTORNEY

MECHANICAL COMMUNICATION SWITCHBOARD

Filed April 26, 1949 13 Sheets-Sheet 4

INVENTORS W. W. CARPENTER
P. B. MURPHY
BY
John E. Cassidy
ATTORNEY

INVENTORS W. W. CARPENTER
P. B. MURPHY
BY John E. Cassidy
ATTORNEY

INVENTORS W. W. CARPENTER
P. B. MURPHY
BY John E. Cassidy
ATTORNEY

MECHANICAL COMMUNICATION SWITCHBOARD

INVENTORS W. W. CARPENTER
P. B. MURPHY
BY John E. Cassidy
ATTORNEY

MECHANICAL COMMUNICATION SWITCHBOARD

INVENTORS W. W. CARPENTER
P. B. MURPHY
BY John E. Cassidy
ATTORNEY

INVENTORS W. W. CARPENTER
P. B. MURPHY
BY John E. Cassidy
ATTORNEY

INVENTORS W. W. CARPENTER
P. B. MURPHY
BY John E. Cassidy
ATTORNEY

INVENTORS W. W. CARPENTER
P. B. MURPHY
BY John E. Cassidy
ATTORNEY

INVENTORS W. W. CARPENTER
P. B. MURPHY
BY John E. Cassidy
ATTORNEY

MECHANICAL COMMUNICATION SWITCHBOARD

Filed April 26, 1949 13 Sheets-Sheet 13

INVENTORS W. W. CARPENTER
P. B. MURPHY
BY John E. Cassidy
ATTORNEY

Patented Mar. 31, 1953 2,633,502

UNITED STATES PATENT OFFICE 2,633,502

MECHANICAL COMMUNICATION SWITCHBOARD

Warren W. Carpenter, Garden City, and Paul B. Murphy, Grand View, N. Y., assignors to Bell Telephone Laboratories, Incorporated, New York, N. Y., a corporation of New York Application April 26, 1949, Serial No. 89,757

53 Claims. (Cl. 179—51)

The present invention relates to switching mechanism for establishing connections between selected pairs of a plurality of communication channels.

In conventional automatic central office equipment, connection between a calling and a called subscriber line or trunk is generally established by means of switching mechanism involving the large-scale multipling of lines, the duplication of relays and other switching devices, and the provision of large numbers of contact points not a few of which are engaged for the entire duration of a connection. On account of this complexity the automatic exchange compares unfavorably with semi-automatic or manual exchanges, in addition to the fact that the automatic equipment is inferior to that of a manually operated switchboard as far as ruggedness and mechanical stability is concerned.

The general object of the present invention is to provide a novel type of switching mechanism combining the ruggedness and simplicity of the ordinary manual switchboard with the speed of operation and ease of supervision of an automatic exchange.

More specifically it is an object of this invention to provide, in a communication system, an automatic switchboard operator or robot adapted to put through to a selected subscriber or trunk a call originating with a calling subscriber or trunk, by establishing a plug-and-jack connection between the two lines, and to break the connection physically upon reception of a supervisory signal, thereby restoring the mechanism to normal.

Another object of the invention is to provide, in a central office or private branch exchange including switch means individual to respective lines and switching equipment common to a plurality of lines, a novel type of mechanism for automatically establishing a connection between two lines in such manner that no part of the common equipment remains engaged once the connection has been set up, communication being maintained by means of a pair of cord-connected plugs and associated circuits of which enough are provided to take care of anticipated peak loads with a minimum of delay.

A further object of this invention is to provide a robot mechanism of the character described having means for automatically inserting answering plugs and calling plugs into jacks and for withdrawing the plugs at the end of the conversation, and for gathering up unused plugs in such manner as to keep them in preparation to answer an incoming call.

Still another object of the invention is to provide, in a communication system, simple and effective means for automatically inserting a male connector or plug into a selected one of a plurality of female connectors or jacks.

A still further object of this invention is to provide, in a communication system, means for selectively disengaging idle plugs from their respective jacks and for preventing jamming of the mechanism due to entanglement of their associated cords.

Broadly speaking, the invention provides, in combination, in a communication system comprising a plurality of incoming and outgoing channels, operating mechanism for picking up a plug associated with an incoming channel in response to a call signal received over said channel, a control circuit responsive to direction-indicating signals, received over the incoming channel, for directing said mechanism to insert the plug into a jack associated with a selected outgoing channel, and disconnect means responsive to a supervisory signal, received over one of said channels, for withdrawing the plug from the jack and restoring the system to normal.

A preferred embodiment of the invention comprises a robot mechanism provided with a plurality of answering plugs each paired with a respective calling plug and connected to the calling plug over an individual cord circuit including an answering cord and a calling cord, a plurality of jacks each associated with a line, a plug carrier, a supervisory circuit common to all cord circuits, and operating mechanism controlled by the supervisory circuit in such manner as to deposit a supply of available answering plugs in a magazine whenever the respective cord circuits are idle, then in response to a call signal to direct the plug carrier toward the jack associated with the calling line, operate the plug carrier to transfer one of the answering plugs from the magazine to the said jack, cause the plug carrier to pick up the calling plug paired with the said answering plug, subsequently to direct the plug carrier toward another jack in accordance with line selecting signals received over the calling line, operate the plug carrier to insert the calling plug into the selected jack, thereupon to return the plug carrier to a normal position in readiness for further calls, and finally to effect the withdrawal of both plugs from their respective jacks in response to an end-of-connection signal. The plug carrier is arranged to carry out two different movements, preferably in horizontal and in vertical direction.

The robot mechanism may be used to effect connections between subscriber lines, between trunk lines, or between trunk and subscriber lines, and is applicable to central offices as well as to private branch exchanges. The number of lines served by each robot mechanism may be a multiple of the number of cord circuits provided therein, the ratio generally depending on the number of connections which the equipment is designed to handle simultaneously at peak load.

Where the load is particularly heavy and the number of lines served is large, two or more robots according to the invention may be arranged in tandem, with the lines multiplied thereto, for the purpose of giving increased traffic-handling facilities without undue mechanical complications of the equipment. In such an event it will also be possible, through the use of control switches of a type known per se, to designate one or more robots as the principal switching equipment and to use one or more other robots as a spare or spares, to be connected in circuit only when a principal robot becomes electrically or mechanically disabled.

The above and other objects and features of the invention will become more fully apparent from the following detailed description, reference being had to the accompanying drawings in which.

Figure 1:
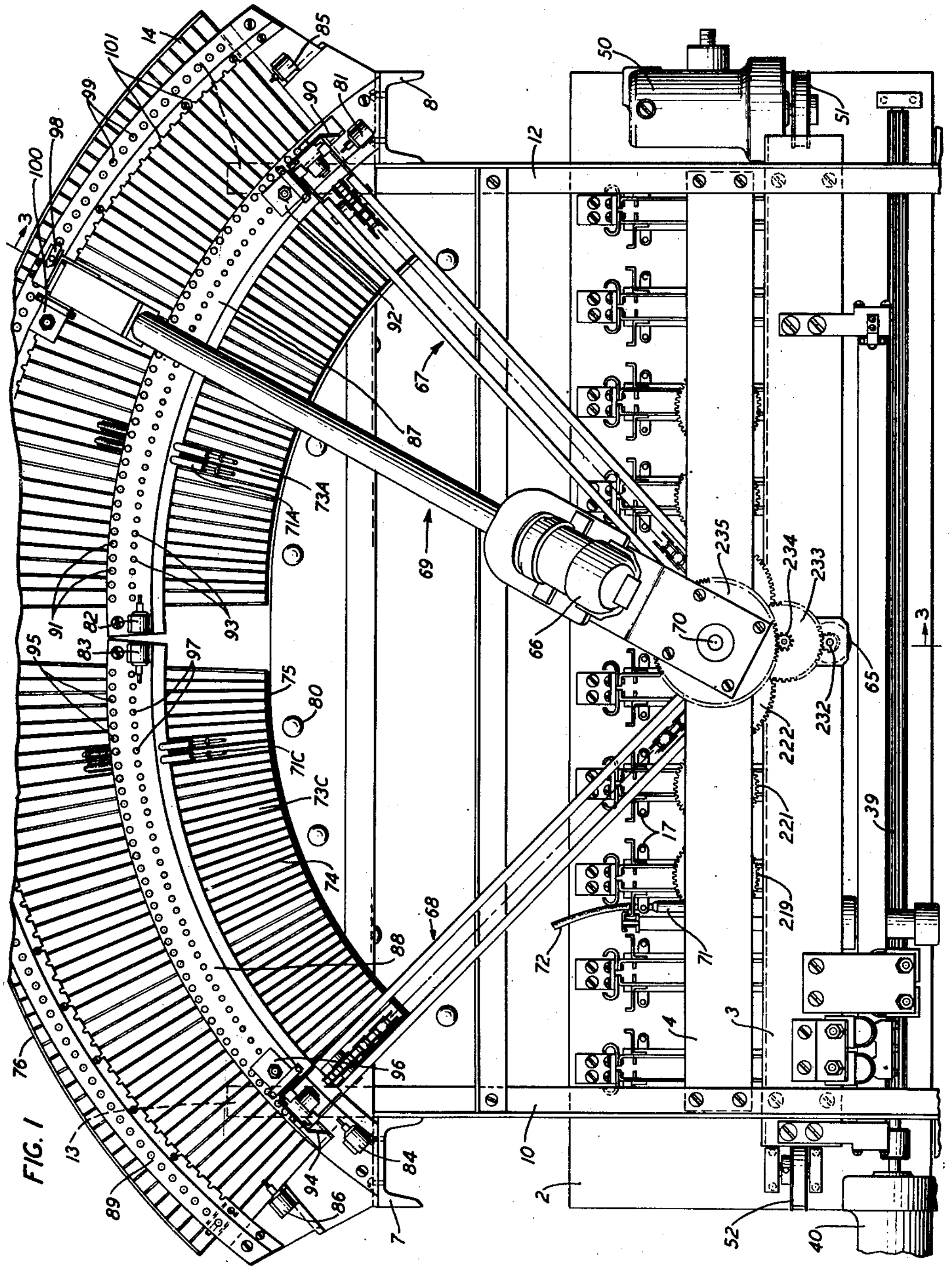
Fig. 1 is a top plan view of a switching apparatus according to the invention.
Figure 17:
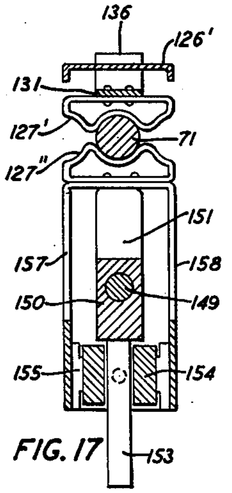
Fig. 17 is a sectional view taken on the line 17—17 of Fig. 15.
Figure 17A:
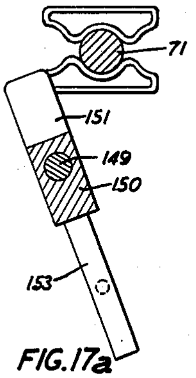
Figure 17B:
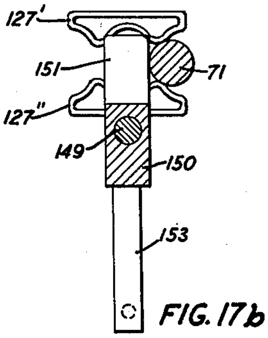
Figure 17C:
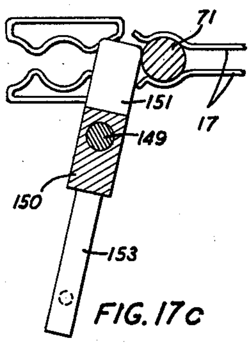
Figure 16:
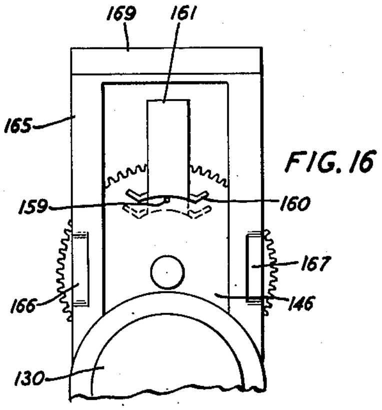
Fig. 16 is a fragmentary front view of the plug carrier.
Figure 23:
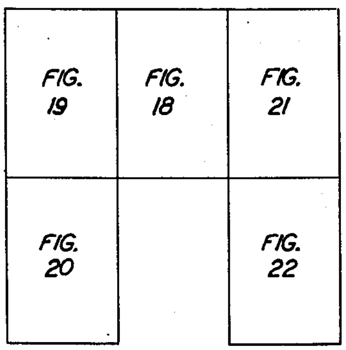
Figure 18:
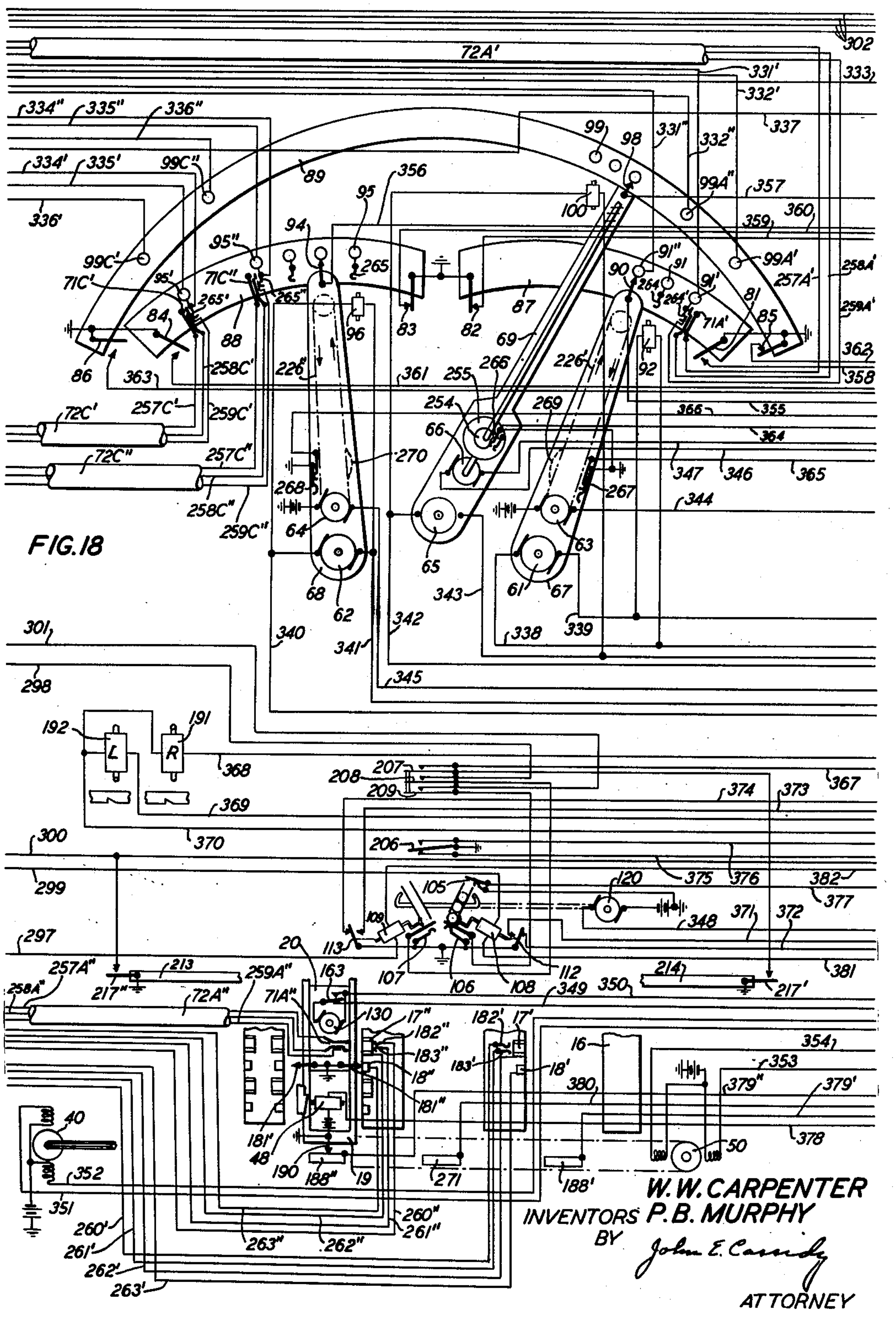
Figure 19:
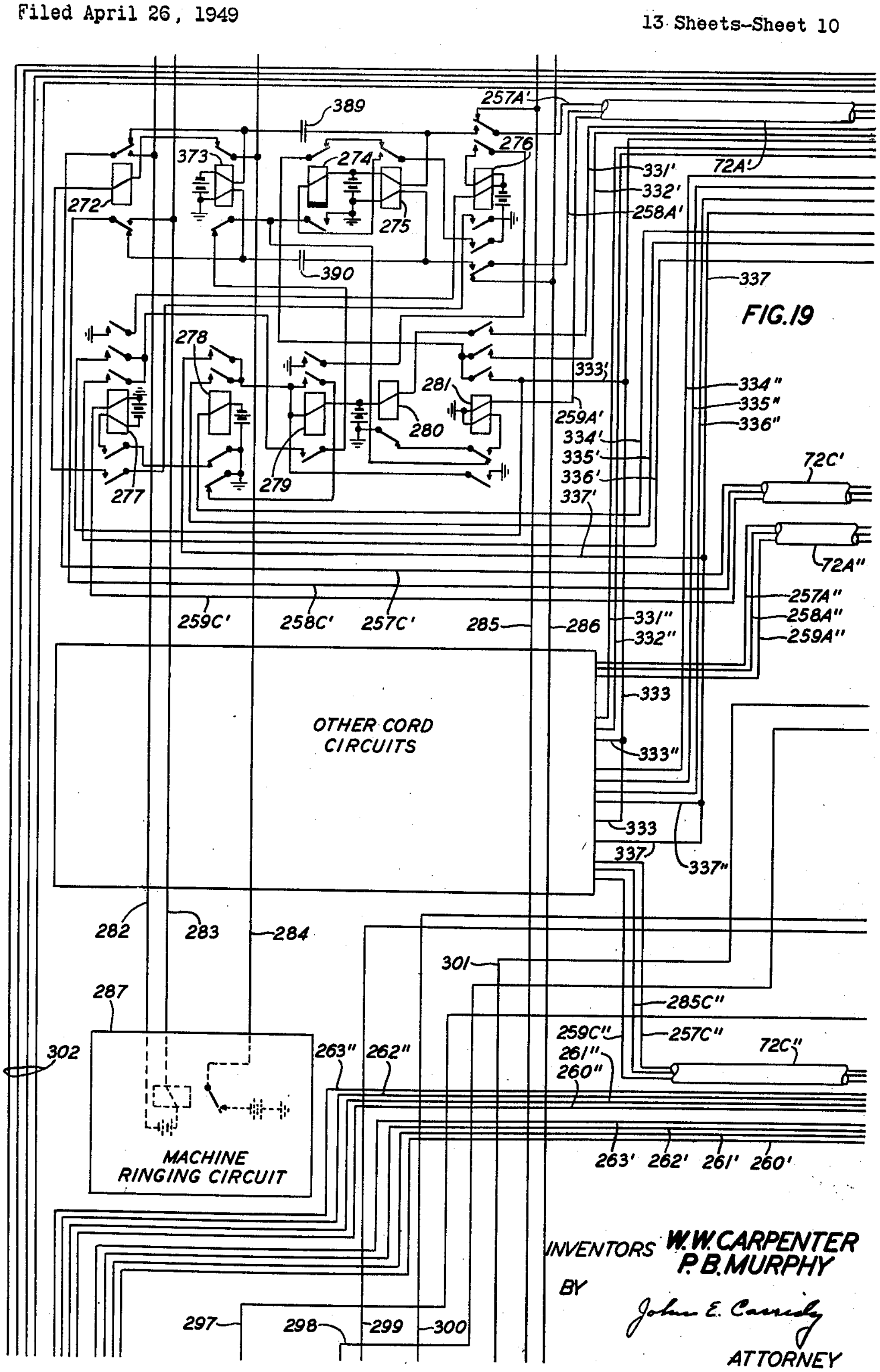
Figure 20:
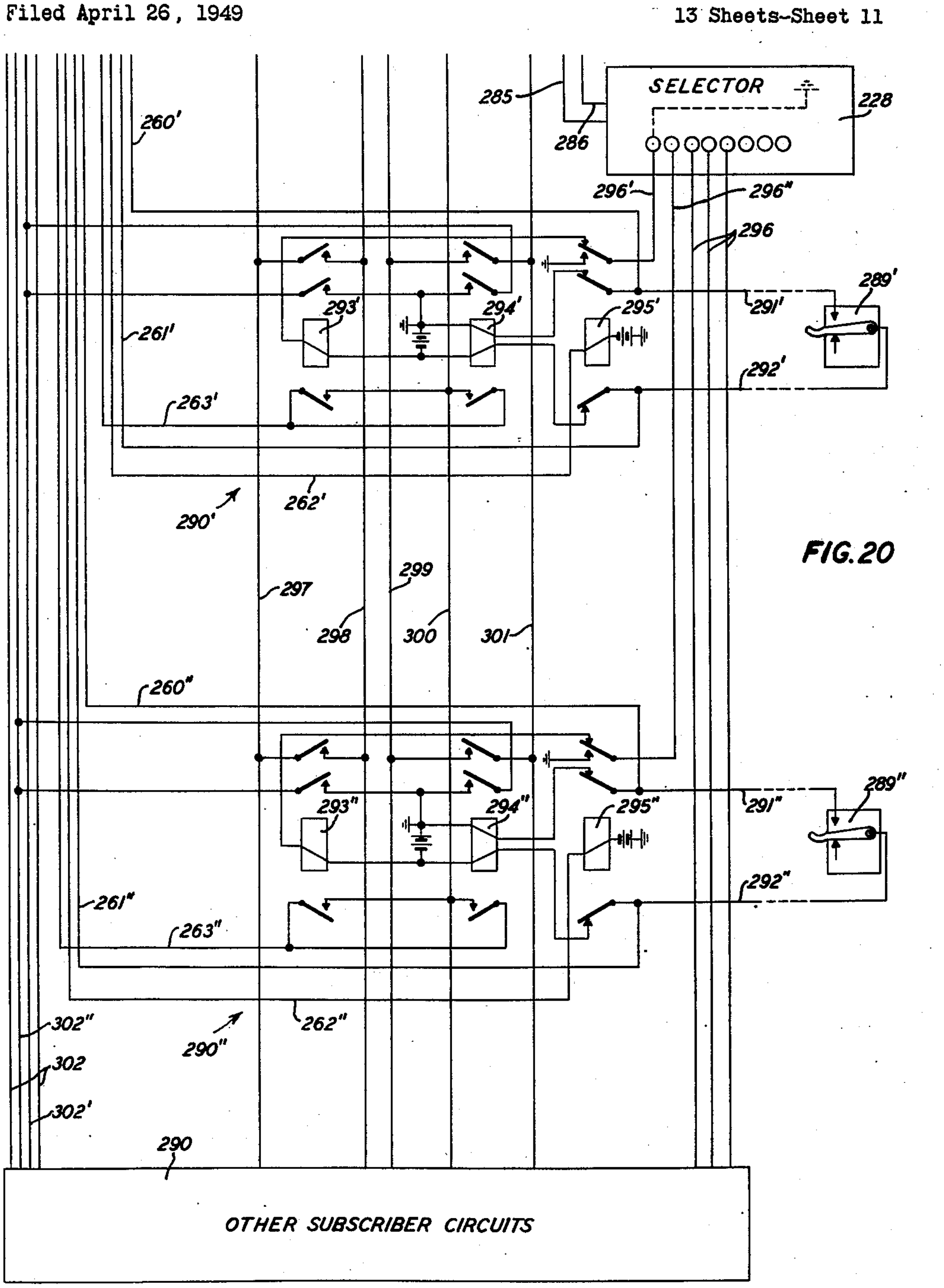
Figure 21:
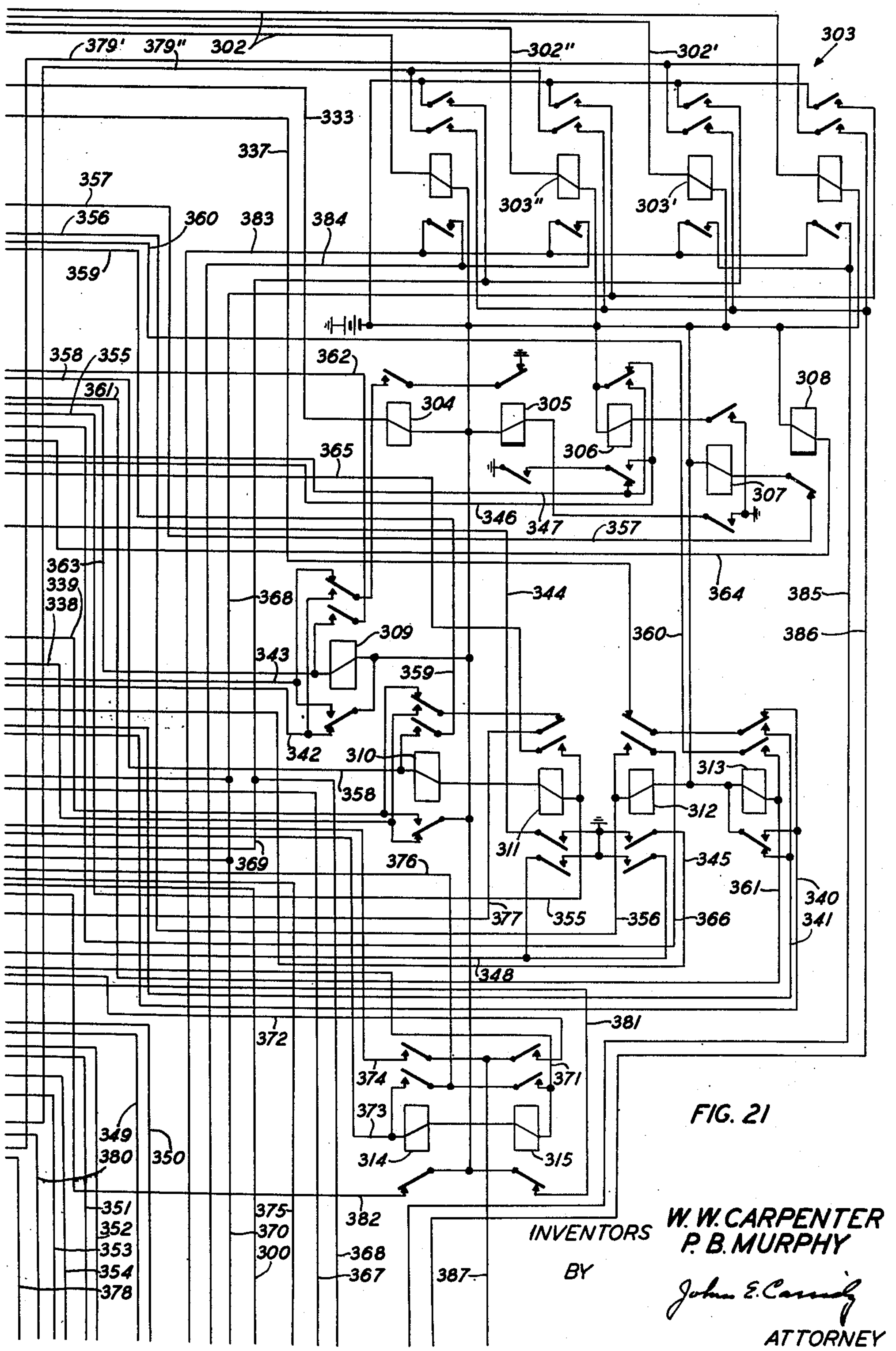
Figure 22:
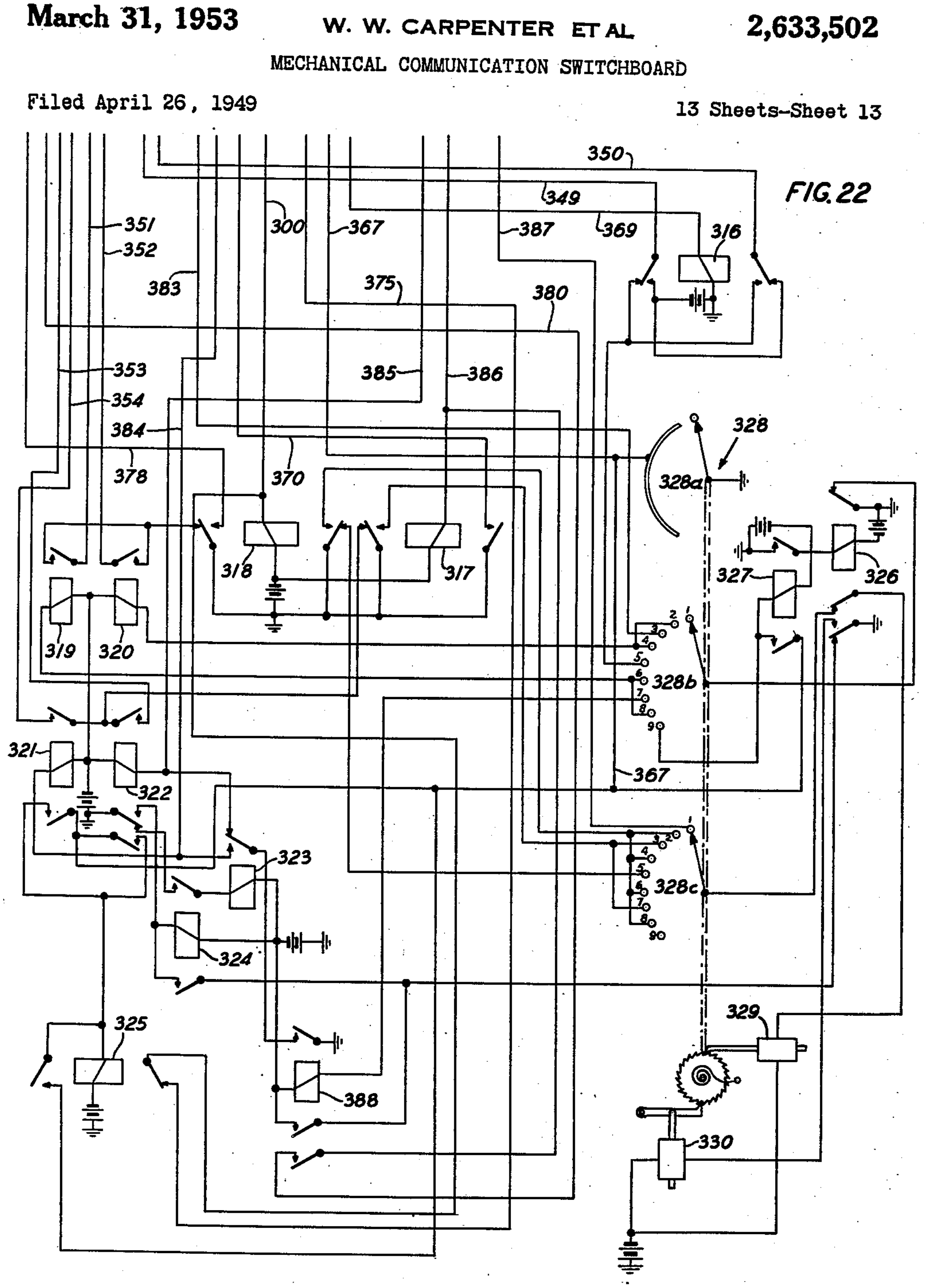

Figs. 17*a*, 17*b*, and 17*c* are views similar to Fig. 17 but showing the plug transfer mechanism in different operating positions;

Fig. 18 is a circuit diagram of the apparatus proper, showing the various elements thereof in approximately the relative position they occupy in Figs. 1 (top of Fig. 18) and 2 (bottom of Fig. 18);

Fig. 19 is a circuit diagram showing a plurality of cord circuits associated with the apparatus;

Fig. 20 is a circuit diagram showing a plurality of subscriber line circuits associated with the apparatus;

Figs. 21 and 22 show different parts of the supervisory circuit associated with the apparatus; and Fig. 23 shows the relative position which Figs. 18 through 22 occupy in the overall circuit diagram.

*Introduction*

Two subscriber line circuits and one cord circuit are shown in complete detail by way of example. Only a small number of cords, jacks and plugs have been shown in the various views, in their proper places, for the sake of clarity. Conventional operating devices such as levers, gears and chains shown otherwise in the various structural views, have been indicated by dot-dash lines in the circuit diagrams.

The only part of the system not shown and described in detail is a selector circuit provided for the purpose of marking the jack of a line selected by the calling subscriber. This circuit is fully conventional and responds to direction-indicating signals, such as dial pulses, sent over the calling line.

The apparatus illustrated in the drawing has been designed for one thousand subscriber lines served by forty cord circuits. The associated jacks are distributed over twenty jack plates each carrying fifty jacks. The unit actually constructed has a width of 32″, a height of 43″ and a depth of 34″. It will be understood that these figures are given merely as an illustration and in no way limit the invention.

*General construction*

Figure 2:
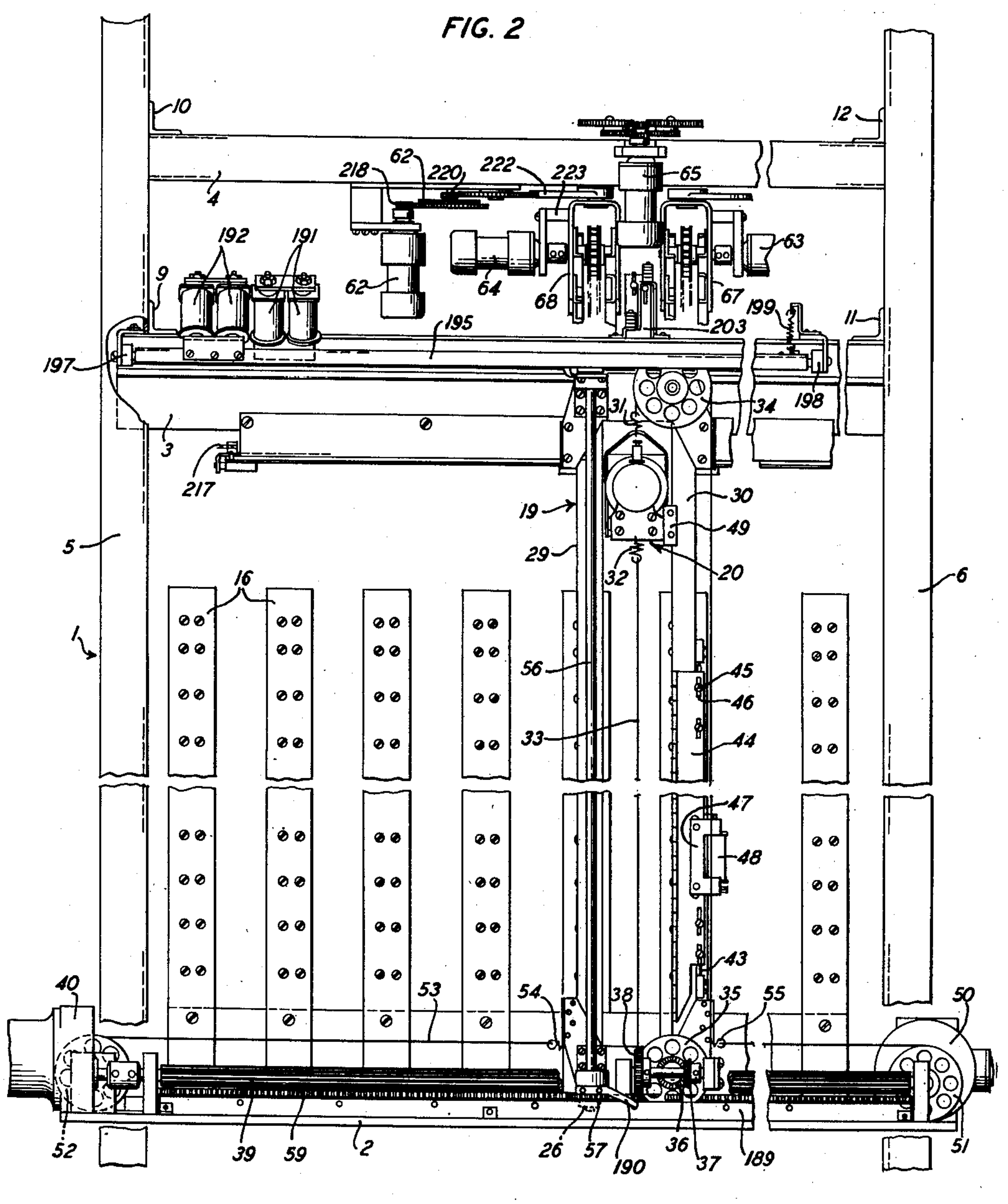
Fig. 2 is a front view of the apparatus shown in Fig. 1.
Figure 3:
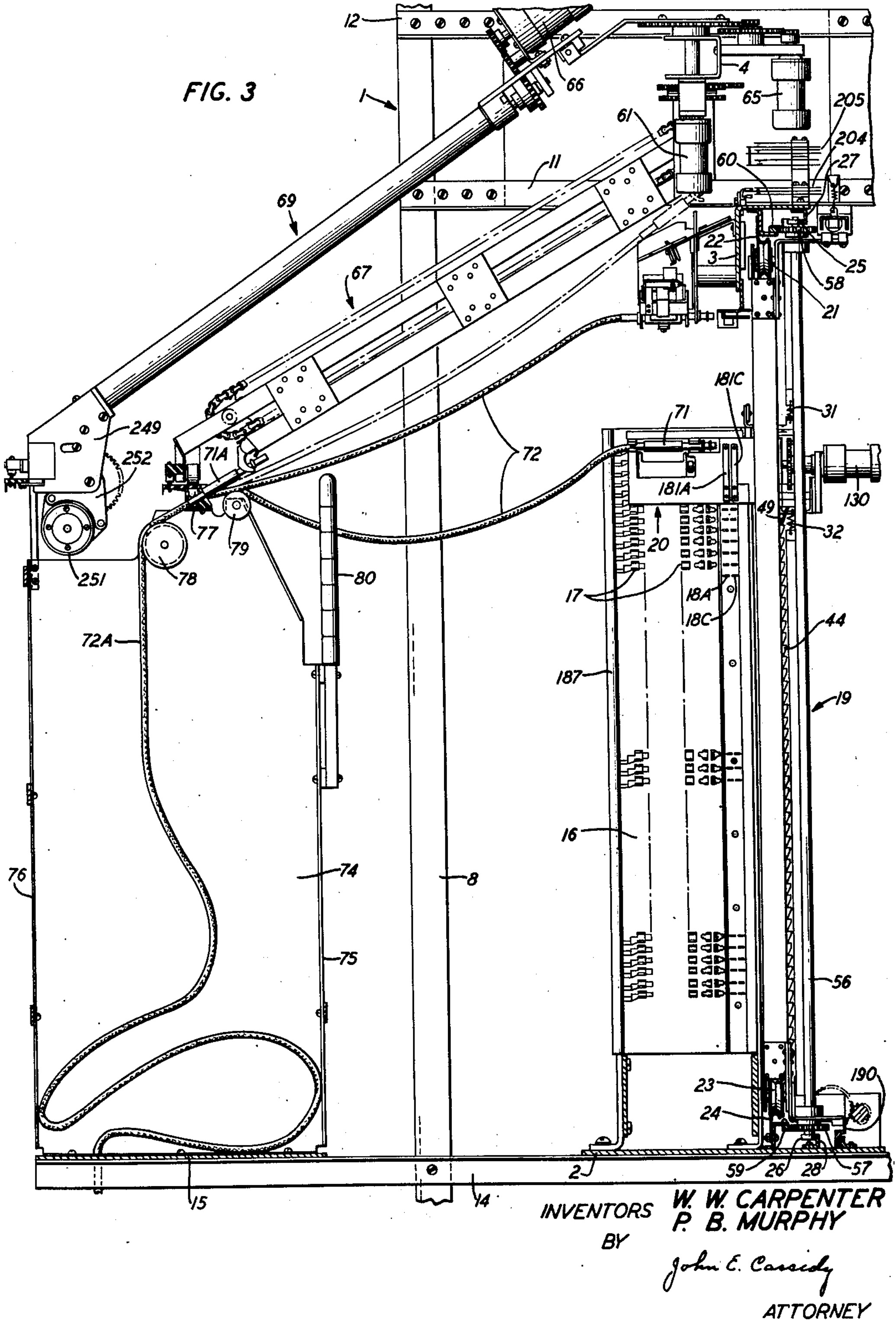
Fig. 3 is a view in sectional elevation taken at right angles to that of Fig. 2 and showing the principal parts of the apparatus in side view.

(Figs. 1–3)

The various parts of the robot mechanism about to be described are supported on a frame 1 which comprises a base 2, cross bars 3, 4 and four uprights 5, 6, 7 and 8. Two pairs of connecting pieces 9, 10 and 11, 12 span the uprights 5, 7 and 6, 8 respectively, cross bar 3 being suspended from pieces 9, 11 and cross bar 4 being similarly suspended from pieces 10, 12. The base 2 rests on additional cross pieces 13, 14 which also support a rear plate 15 of generally segmental configuration.

Rising vertically from the base 2 are a plurality of spaced parallel jack plates 16 each mounting a row of vertically spaced jacks 17 on each face thereof, together with a like number of pairs of commutator segments 18A, 18C for answering and calling, respectively. Displaceable in front of these jack plates is a horizontally movable carriage 19 supporting a plug carrier 20 for vertical travel. The carriage 19 is provided with an upper grooved roller 21, engaging a vertical guide rail 22 depending from the cross bar 3, and with a lower grooved roller 23, engaging a similar rail 24 rising from the base 2. Other rollers 25, 26 engage horizontal guide rails 27, 28 supported on cross bar 3 and on base 2, respectively. Each pair of adjacent jack plates 16 defines a vertical channel in which the plug carrier 20 may move up and down on the carriage 19.

The plug carrier 20 engages the vertical members or legs 29, 30 of the carriage 19 and is connected through coil springs 31, 32 to the extremities of a steel ribbon 33 which passes under tension around an upper pulley 34 and a lower pulley 35. The latter pulley is driven via gears 36, 37 and 38 from an elongated pinion represented by a grooved rod 39, this rod in turn deriving its motion from the shaft of a motor 40 controlling the vertical travel of the plug carrier. (This arrangement is shown more clearly in Fig. 4.) The leg 30 of the carriage mounts a pair of vertically spaced bearings 41, 42 in which there is journaled a rod 43; a serrated strip 44, resiliently suspended by suitable means (not shown), is secured to this rod by means of studs 45, engaging slots 46, thus allowing for a certain play in the vertical direction. Strip 44 has a magnet armature 47 secured thereto and may pivot on rod 43 under the control of a vertical stop magnet 48; when this magnet is energized, one of the saw teeth on strip 44 cooperates with a lug 49, provided on the plug carrier 20, to arrest the latter in a position aligned with a desired jack 17.

Horizontal movement of the carriage 19 and, with it, of the plug carrier 20 is controlled from a motor 50 driving a pulley 51, this motor being located on the right-hand side of the apparatus as viewed in Fig. 2. A similar pulley 52 is mounted on the left-hand side, the two pulleys 51, 52 being engaged by a steel ribbon 53 connected under tension, through coil springs 54, 55, to the legs 29, 30 of the carriage 19. In order to insure parallel movement of the upper and the lower end of carriage 19, the latter is provided with a vertical shaft 56 carrying a lower pinion 57 and an upper pinion 58, meshing respectively with a rack 59 supported on base 2 and with a rack 60 supported on cross bar 3.

Figures 5, 6, 7, 8:
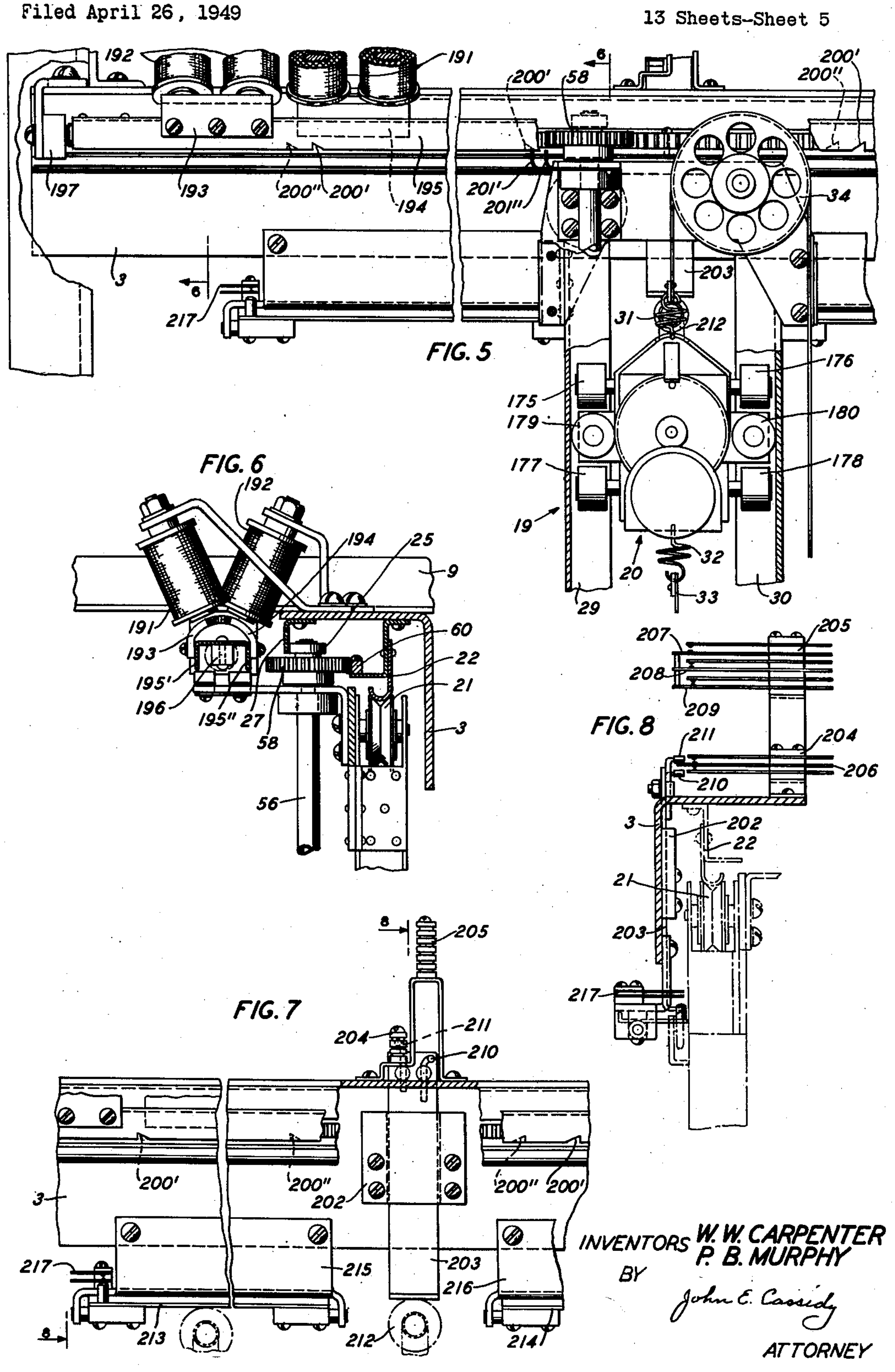
Fig. 5 is a fragmentary front elevation of the plug carrier and adjoining parts of the apparatus.
Fig. 6 is a sectional view taken on the line 6—6 of Fig. 5.
Fig. 7 shows, in front view, certain switches controlling the movement of the plug carrier.
Fig. 8 is a sectional view taken on the line 8—8 of Fig. 7.

The upper portion of the carriage 19 and adjoining parts of the structure are more clearly shown in Figs. 5 and 6.

The principal functions of the apparatus, apart from the displacement of the plug carrier, are carried out by six motors designated 61 through 66. Three arms 67, 68 and 69, all swingable about a common pivot 70 located centrally at the cross bar 4, are operated by these motors in a manner subsequently described to pick up answering plugs, pick up calling plugs and withdraw answering as well as calling plugs, respectively.

The plugs generally designated 71, have cords 72 connected thereto and are grouped into answering plugs 71A and calling plugs 71C. As viewed in Fig. 1, the right-hand side of the apparatus is reserved for answering plugs and cords, the left-hand side being reserved for calling plugs and cords.

Individual compartments 73A, 73C for each answering and calling cord are formed in the rear of the machine by a plurality of partitions 74, rising from the rear plate 15 and extending radially toward the pivot 70, these partitions being provided with inner flanges 75 and outer flanges 76 forming front and rear walls for the respective compartments. They also carry socket pieces 77 adapted to receive idle plugs 71A or 71C, this being more clearly shown in Fig. 12. There are further provided in each compartment a pair of guide rollers 78, 79 for guiding the cords 72 during movement of their plugs. Other, vertical guides 80 are disposed at intervals to facilitate movement of the plugs and prevent entanglement of the cords.

The sweep of the arms 67, 68 and 69 is determined by three pairs of limit switches 81, 82; 83, 84; and 85, 86. Switches 81, 82 mark the ends of an answering-plug pick-up track 87, associated with arm 67; switches 83, 84 mark the ends of a calling-plug pick-up track 88, associated with arm 68; and switches 85, 86 mark the ends of a pull-down track 89, associated with arm 69. These arms are oscillated over their associated tracks by means of motors 61, 62 and 65, respectively, the direction of their rotation being reversed upon engagement of either limit switch of a respective pair by the arm.

Arm 67 carries a contact spring 90, adapted selectively to engage any one of a plurality of contacts 91 positioned on the track 87 opposite respective compartments 73A, as well as a solenoid 92 provided with a plunger designed to drop into one of several holes 93 in order to align the arm with a selected answering plug 73A. In like manner, the arm 68 carries a contact spring 94, cooperating with contacts 95, as well as a solenoid 96 adapted to engage any one of a number of holes 97 on track 88. Arm 69 is provided with a contact spring 98, arranged to engage contacts 99, and with a solenoid 100 the plunger of which may enter any one of a plurality of cutouts 101 formed on the track 89.

Arm 67 is designed to pick up answering plugs 71A and deposit them in a chamber of a stationary plug magazine. Arm 68 is similarly designed to pick up calling plugs 71C and deposit them in another chamber of the plug magazine. Arm 69 is designed to engage the cord 72 of any plug 71 no longer in circuit for the purpose of withdrawing the plug from the jack 17 into which it had been inserted by the plug carrier, thereby making both the jack and the plug available for further calls. Before proceeding with the description of the operating mechanism associated with each of these arms, it will be desirable to describe in some detail both the plug carrier and the magazine.

*The plug magazine*

Figure 14:
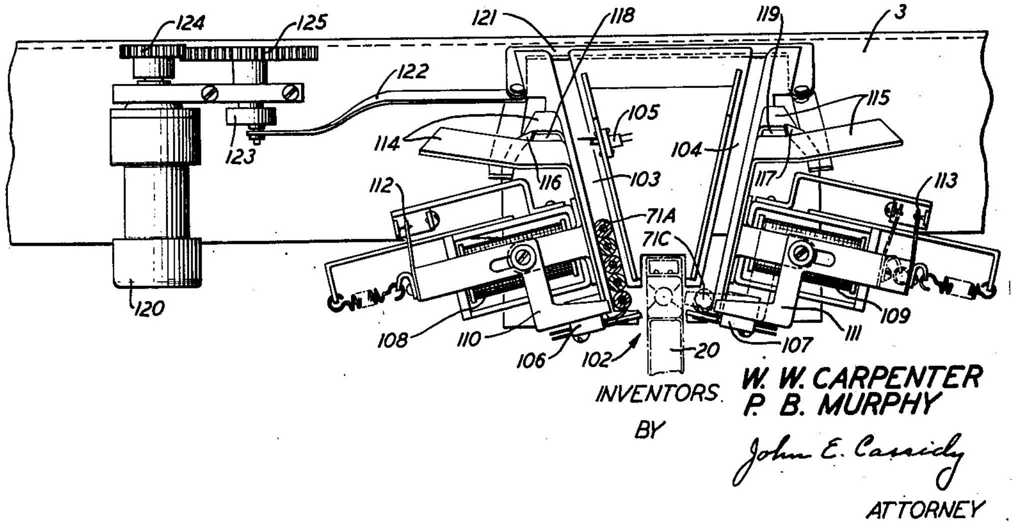
Fig. 14 is a rear view of the magazine portion of the plug carrier, taken on the line 14—14 of Fig. 12.
Figure 15:
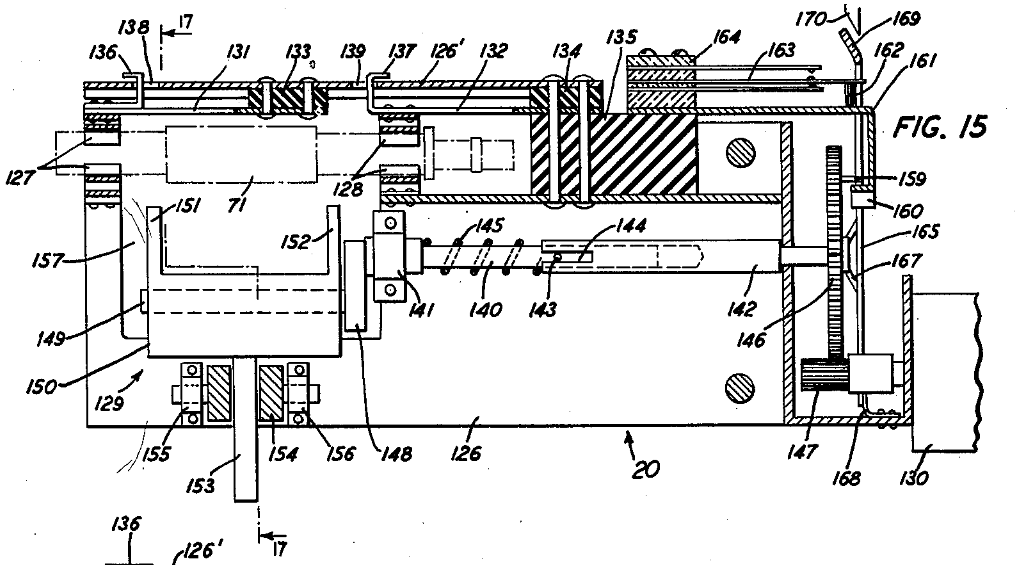
Fig. 15 is a sectional elevation of the plug carrier, showing the plug transfer mechanism thereof.

(Fig. 14)

This element, generally indicated at 102 (see Fig. 14), is fixed to the rear of cross bar 3 in alignment with the central one of the vertical channels separating the jack plates 16 (Fig. 2). The magazine 102 comprises a first chamber 103, at the left in Fig. 14, and a second chamber 104. Chamber 103 receives answering plugs 71A from the arm 67 while chamber 104 receives calling plugs 71C from the arm 68. The two sides of the magazine 102 are identical, except that the left-hand side is provided with a pair of contacts 105 which are closed when the chamber 103 is less than full. Contacts 106 and 107, at the bottom of the magazine, are closed when a plug is in chamber 103 or 104, respectively.

Associated with the two chambers are a pair of solenoids 108, 109. Each solenoid operates a pair of bell crank levers 110, 111 (see also Fig. 12) adapted to push an answering plug or a calling plug into the plug carrier 20 when the latter is in its home position adjacent the magazine 102, this being also the position in which the plug carrier is shown in Fig. 2. The plungers of the solenoids also operate switch-over contacts 112, 113, respectively, for purposes subsequently described.

To facilitate the work of the pick-up arms 67, 68, the magazine is provided with two wings 114, 115 extending at a slight incline from the top of the chambers 103, 104, respectively, thus forming chutes over which the plugs may slide into these chambers. This action is assisted by a pair of fingers 116, 117 which are adapted to oscillate in slots 118, 119, provided in the wings 114, 115, under the control of an auxiliary motor 120 supported from the cross bar 3. The two fingers are interconnected by a link 121 which is reciprocated by means of a lever 122 connected to a crank 123, the latter being rotated from the motor 120 through the intermediary of gears 124 and 125. Motor 120 is connected to be energized simultaneously with the pick-up devices associated with arms 67, 68.

*The plug carrier*

(Figs. 4, 15, 16, 17)

The principal parts of this unit are a casing 126, a pair of plug holders 127, 128 inside the casing, a plug transfer mechanism generally indicated at 129, and a plug connector motor 130 carried outside the casing 126.

Each of the plug holders comprises an upper and a lower jaw, the lower jaw being fixed to a portion of the casing, the upper jaw being yieldably mounted on flat spring arms 131, 132, respectively, secured to the casing through a single insulator 133, which may be of hard rubber, in the case of arm 131 and a pair of similar insulators 134, 135 in the case of arm 132. Each of the spring arms 131, 132 is provided with a lug 136, 137 which, passing through an aperture 138, 139 in the cover 126' of the casing, prevents the jaws from closing without, however, interfering with the upward displacement of the upper jaw. Into these holders the plug 71 is inserted sideways, through the action of bell crank levers 110 or 111 (Fig. 14), to be dislodged in like manner by the mechanism 129 for transfer to an adjacent jack 17.

The transfer mechanism comprises a shaft 140 which is journaled in a bearing 141 and extends into the center bore of a sleeve member 142, being entrained by the latter through a pin 143 which engages a slot 144 provided in the sleeve member 142. A spring 145 urges the member 142 towards the front wall of the casing 126 through which the reduced end of this member projects, carrying a gear 146 which meshes with a pinion 147 driven from the motor 130.

Keyed to the free end of shaft 140 is a crank arm 148 having a crank pin 149 which projects through the body of a pusher member 150 having prongs 151, 152 and a stem 153. This stem passes slidably through a sleeve 154 which itself is pivotally lodged in bearings 155, 156. The prongs 151, 152 are of such length as to clear a plug 71, held by the plug holders 127, 128, when the crank pin 149 is in its bottom position shown in Figs. 15 and 17; the casing 126 is provided with a pair of lateral cutouts 157, 158 through which the plug may be inserted into the holders, in the manner previously set forth, when the pusher member 150 is out of the way.

To transfer a plug from the holders 127, 128 into a waiting jack 17 (Fig. 17c), each of the prongs 151, 152 describes a noncircular path which brings the tip of the prong into alignment with the plug and eventually causes the latter to leave the holders 127, 128 and to enter the corresponding clips of the jack. This is clearly seen in Figs. 17, 17*a*, 17*b* and 17*c* in which it is assumed that motor 130 rotates in such direction as to effect clockwise rotation of the crank pin 140, as viewed in these figures. Fig. 17 shows the pusher member at rest; Fig. 17*a* illustrates the preparatory swing of this member to the left; Fig. 17*b* shows the dislodgment of the plug 71 from the holder, an action which cams the upper jaw 127' upwards and away from that lower jaw 127'' to free the plug; in Fig. 17*c*, finally, the plug has been inserted between the clips of the jack which will securely retain it after the member 150 has completed its movement and returned to its normal position.

The gear 146 carries on its front face a pin 159 designed to cooperate with a cam 160 which is formed on a depending portion of flat spring arm 161, the latter being mounted on the insulator 135. Arm 161 coacts with a projection 162, depending from a contact spring 163, to operate a set of contacts mounted in an insulating spring nest 164. Normally, the arm 161 and the cam 160 are in the position illustrated in Fig. 15 and indicated in dot-dash lines in Fig. 16; spring 163 then engages with its lower contact. After the pin 159 has made one revolution to the left or to the right in Fig. 16, the assembly 160—163 is cammed upwards as shown in full lines in Fig. 16 to open the lower contact and close the upper contact of spring 163; this action de-energizes motor 130 (at the lower contacts) and short-circuits its armature (at the upper contacts), thereby dynamically braking the motor.

For the purpose of restoring the assembly to normal there is provided a yoke 165 the two arms of which are formed with punched-out projections 166, 167 adapted to engage the face of gear 146 well outside the path of pin 159. The lower ends of the yoke are hingedly secured to the casing 126 by means of flexible straps 168 permitting a swinging movement of the yoke. The latter is provided at the top with an inclined portion 169 adapted to cooperate with a cam surface 170, depending from the cross bar 3, for the purpose of tilting the yoke 165 towards the left (as viewed in Fig. 15) when the plug carrier reaches its home position adjacent the magazine 102. Such a movement of the yoke displaces the toothed disc 146 towards the left, against the force of spring 145, thereby disengaging the cam 160 from the pin 159 and permitting the assembly 160—163 to return to normal, preparatory to the next energization of motor 130.

Figure 4:
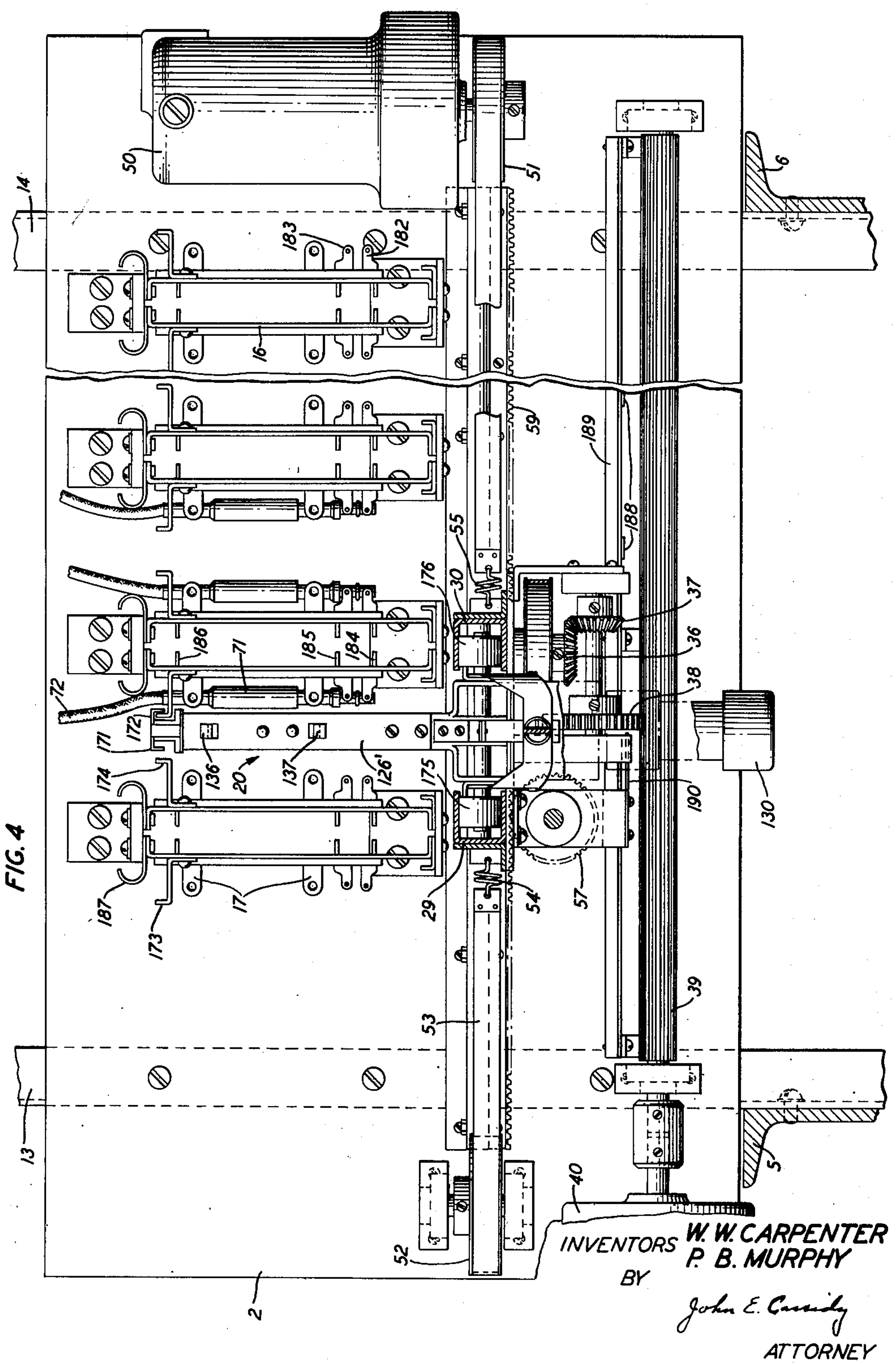
Fig. 4 is a fragmentary top view on a larger scale than the preceding views, with parts broken away to expose the underlying elements of the apparatus.

Turning now more particularly to Fig. 4, it can be seen there that the plug carrier 20 is provided at its rear with a pair of hooks 171, 172 adapted to engage respective angle pieces 173, 174 provided on the left-hand and right-hand faces of jack plates 16. These angle pieces serve as guides for the plug carrier, angle piece 173 being engaged by hook 172 when the plug carrier is positioned to cooperate with one of the left-hand jacks, angle piece 174 being engaged by hook 171 when the plug carrier is positioned to cooperate with one of the right-hand jacks. The angle pieces also serve to take up the reaction when the pusher member 150 transfers a plug to a jack.

The plug carrier 20 is further provided with three pairs of guide rollers 175, 176, 177, 178, 179, 180; as best shown in Fig. 5, these rollers respectively engage the legs 29, 30 of the carriage 19. In addition it carries two pairs of grounded springs 181A, 181C (Fig. 3), one pair on each side, for the purpose of making contact with the answering and calling segments 18A, 18C, respectively, which are associated with the jack next to which the plug carrier is to be arrested.

Fig. 4 also shows the tip and ring connectors 182, 183 associated with each jack 17, as well as the tip, ring and sleeve terminals 184, 185 and 186 thereof. Each jack plate 16 further carries a rounded deflector 187 designed to guide the cord 72.

Fig. 4 makes it plain that the plug carrier has two positions in each of the channels which separate adjacent jack plates 16; a first position adjacent the left-hand jacks of the right-hand plate, and a second position adjacent the right-hand jacks of the left-hand plate. For the purpose of marking a selected channel there are provided a plurality of commutator segments 188, carried on a commutator strip 189 which is supported on the base 2, these segments being engageable by a grounded brush 190 mounted on the carriage 19 (see also Figs. 2 and 3). The alternative stopping positions of the carriage within each channel are selected by an arrangement which is similar to the vertical stopping mechanism 44—49, described in connection with Figs. 2 and 3, and which will be explained in connection with Figs. 5 and 6.

*Horizontal stopping mechanism*

(Figs. 5 and 6)

Two pairs of magnets 191, 192 are mounted on the cross bar 3, each pair having an armature 193, 194 secured to one of the flanges 195′, 195″, respectively, of a U-shaped channel member 195; the latter is fixed to a bar 196 pivotally held in bearings 197, 198, a spring 199 (Fig. 2) serving normally to maintain the channel member 195 in a neutral position shown in Fig. 6. The flanges 195′, 195″ are provided with spaced-apart notches 200′, 200″, respectively, these notches cooperating with a pair of lugs 201′, 201″, respectively, when the member 195 is tilted counterclockwise or clockwise (as viewed in Fig. 6) by the energization of magnets 192 or 191, respectively. The lugs 201′, 201″ are secured to the upper end of carriage 19.

From Fig. 5 it will be noted that when the operation of magnets 192 places a notch 200″ in the path of lug 201″, the carriage will be stopped in a position somewhat more to the left than if magnets 191 had operated, placing a notch 200″ in the path of lug 201′. This arrangement permits a relatively wide spacing of the notches on each of the tilting members 195′ and 195″, thus making the time of energization of the magnets less critical than if only a single tilting bar were used. The inclination of the notches 200′, 200″ is reversed on opposite sides of the center channel without, however, changing their relative position (see also Fig. 7).

*Home spring assembly*

(Figs. 7 and 8)

Mounted on the cross bar 3 is a guide member 202 slidably supporting an actuating member 203 for vertical movement. Cross bar 3 also supports a pair of spring nests 204 and 205; spring nest 204 comprises a spring 206 having upper and lower contacts, while spring nest 205 comprises three springs 207, 208 and 209, each associated with a single pair of contacts. Actuating member 203 carries a stud 210 adapted to engage the mechanically interconnected springs 207, 208 and 209 when the actuating member is raised, thereby closing all the contacts of nest 205; this member also carries a stud 211 for depressing the spring 206 when the actuating member is lowered, thereby causing spring 206 to open its upper contacts and to close its lower contacts.

The plug carrier 20 mounts a contact roller 212 adapted to engage the bottom of the actuating member 203 when the carrier arrives in its home position, thereby raising this member into the position shown in Fig. 2; the return of the actuator to the position illustrated in Figs. 7 and 8 is due to its own weight after the plug carrier has descended.

The roller 212 also cooperates with a pair of contact bars 213, 214 positioned to the left and to the right of the center channel, respectively. These contact bars are supported by brackets 215, 216, depending from cross bar 3, for limited vertical movement and are arranged to close respective contacts 217 when engaged by the roller 212. Bars 213 and 214 stop the upward movement of the plug carrier when returning from delivery of a plug to a jack.

*Pick-up mechanism*

Figures 12, 13:
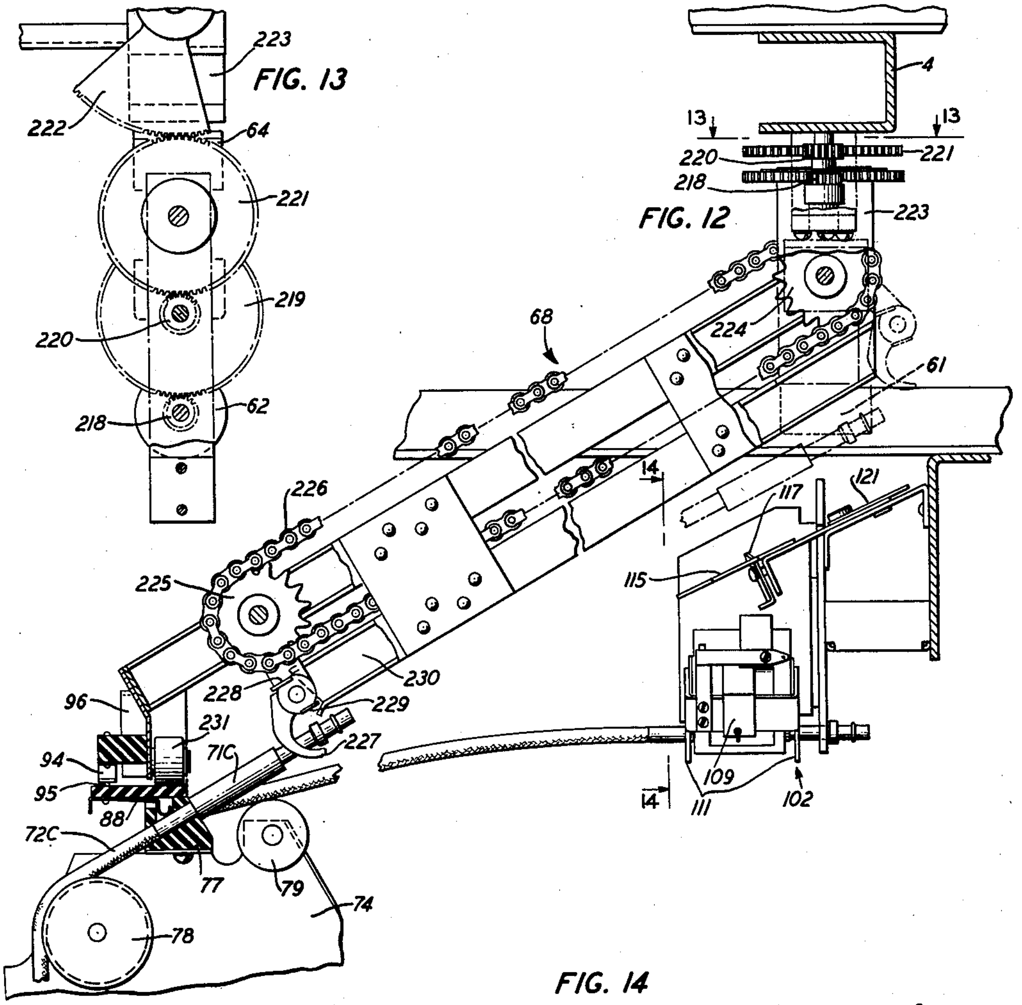
Fig. 12 is a view in side elevation of the pick-up mechanism used for delivering plugs to the plug carrier.
Fig. 13 is a fragmentary top view of the pick-up mechanism, taken on the line 13—13 of Fig. 12.

(Figs. 12 and 13)

The two pick-up arms 67 and 68 being identical, only one of them (the arm 68 delivering calling plugs to the magazine chamber 104) will be described in detail.

Motor 62 controls the swinging movement of the arm 68 through the intermediary of gears 218, 219, 220, 221 and sector gear 222. Motor 64, which is mounted on a bracket 223 (see also Fig. 2), rotates a sprocket 224 which, together with a companion sprocket 225 disposed on the lower end of the arm, supports an endless chain 226. This chain carries on its outer periphery a hook 227 the split end of which is adapted to engage the forward part of a plug 71, while the same is held in the socket 77, and to carry the plug upwards towards the magazine 102, as indicated in dot-dash lines in Fig. 12. The hook 227 is pivotally mounted and is provided with ears 228, 229 which cooperate with a guide channel 230 to insure the correct positioning of the hook, so as to cause the same to grip the plug 71 near the bottom of its travel and to release the plug above the wing 115 of the magazine, thereby enabling the oscillating finger 117 to deposit the plug in the chamber 104 thereof.

Fig. 12 also shows the contact spring 94, engaging contacts 95 on track 88, and the solenoid 96 associated with the arm 68, as well as a guide roller 231.

*Pull-down mechanism*

Figures 9, 10, 11:
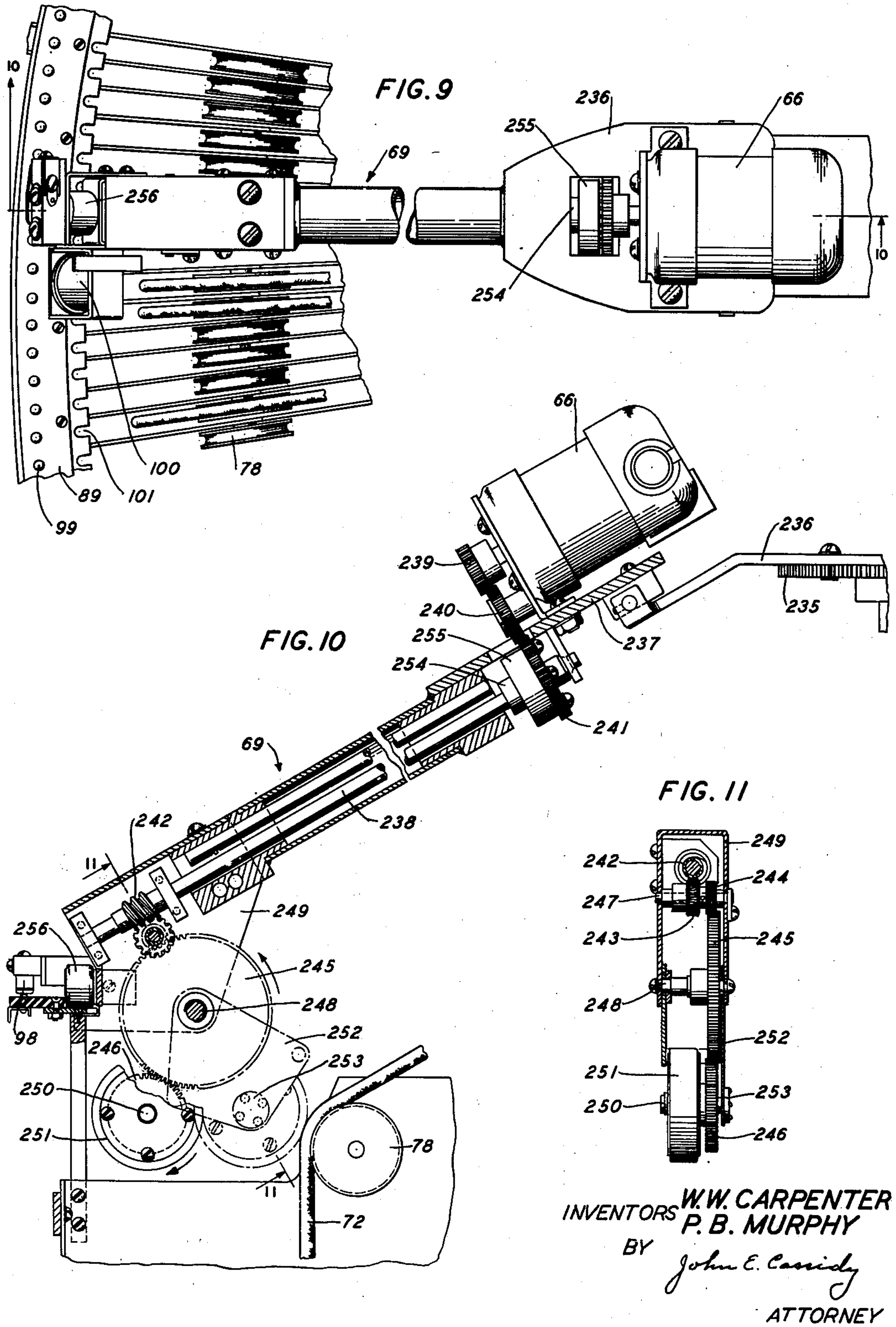
Fig. 9 is a top plan view of the cord pulling mechanism used for breaking down connections.
Fig. 10 is an elevational section taken on the line 10—10 of Fig. 9.
Fig. 11 is an illustration of a detail of the cord pulling mechanism, taken on the line 11—11 of Fig. 10.

(Figs. 9–11)

The arm 69 is rotated from the motor 65 (Fig. 1) over a train of gears 232, 234 and 235. Gear 235 is rigid with a lever 236 which pivotally supports a platform 237 forming the upper part of the arm, this platform in turn carrying the motor 66. The arm comprises a shaft 238 which is rotated from motor 66 via gears 239, 240 and 241. Shaft 238 carries at its lower end a worm 242 which mates with a pinion 243, the latter entraining a set of gears 244, 245 and 246 as best seen in Fig. 11. Pinions 243, 244 are carried on a shaft 247 which, together with a shaft 248 carrying the gear 245, is journaled in a housing 249 forming the lower part of the arm 69. Gear 246 is mounted on a shaft 250 which also carries a rubber-tired wheel 251 and is journaled in a diamond-shaped plate 252; the full lines in Fig. 10 show the wheel 251 in idle position while the dot-dash lines indicate the operated position of the wheel and of plate 251, the latter being swingable about the shaft 248.

The shaft 250 further has mounted thereon a friction disc 253 designed to oppose to a certain extent the rotation of this shaft; this arrangement prevents idle rotation of wheel 251 and causes the entire assembly 246, 250—253 to swing bodily forwards (counter-clockwise in Fig. 10) when the motor 66 operates to rotate the gears in the direction indicated by the arrows; conversely, opposite rotation of the motor will cause the assembly to swing backwards (clockwise in Fig. 10) until the plate 252 encounters a suitable stop (not shown). The first of these movements forces the rubber-tired wheel 251 firmly against the cord 72 of a plug to be withdrawn from its jack, thus clamping the cord between the wheel and the guide roller 78 and resulting in the frictional entrainment of the cord by wheel 251. The second movement disengages the wheel 251 from the cord after the associated plug has been received in its socket 77 (Fig. 12).

It will be understood that the arrangement just described has the further advantage of adapting the friction between the wheel 251 and the cord to the amount of traction necessary for withdrawing the cord, since any increase in resistance will impede the rotation of the wheel, thereby tending to continue the forward swing of plate 252. If, however, the jamming of a plug or other unusual circumstances result in an inordinarily high resistance to pull, a safety device inserted between the motor 66 and the shaft 238 comes into play to prevent further strain upon the cord by its engagement with the wheel 251. This safety device comprises two frictionally coupled clutch halves 254, 255 having contacts arranged to close when an unusually large torque displaces these halves from their normal relative position, these contacts in turn reversing the rotation of motor 66 so as to disengage the wheel 251 from the cord 72.

Figs. 9 and 10 also show the solenoid 100, associated with arm 69, as well as the contact spring 98, engaging the contacts 99 on track 89, and a guide roller 256.

*Brief description of operation*

When the plug carrier 20 is in its normal position, reception of a call energizes the solenoid 108 (Fig. 14) to push an answering plug 71A from the chamber 103 of magazine 102 into the holders 127, 128 of the carrier. Vertical motor 40 then operates to lower the plug carrier from its home position to a position just above the jack plates 16, whereupon the horizontal motor 50 displaces the carriage 19 to the left or to the right until the plug carrier is aligned with the jack field in which an answering segment 18A marked by the incoming call is situated. The latter operation is controlled by the brush 190, which detects a marked segment 188 on the horizontal commutator strip 189, as well as by the stop magnets 191, 192 which operate selectively to arrest the carriage in one of its two alternative positions associated with the selected vertical channel. Next the motor 40 moves the plug carrier down inside the channel until its brush 181A contacts the marked segment 18A, whereupon the plug connector motor 130 operates to insert answering plug 71A into the adjacent jack 17. The plug carrier then returns to its home position.

Motor 62 now swings the arms 68 over the curved track 88 to find the calling plug which is paired with the answering plug 71A inserted into the jack, this particular calling plug being identified by a marking potential (ground) on the associated contact 95. When this contact is detected by the brush 94, motor 62 stops and motor 64 goes into action to deliver the respective calling plug to chamber 104 of the magazine. Solenoid 109 then operates to insert the calling plug into the holders 127, 128 of the plug carrier.

Motors 40 and 50 thereupon direct the plug carrier toward the jack whose calling segment 18C is marked by dialing pulses from the calling subscriber. The calling plug is inserted and the plug carrier returned to home position in readiness for further calls.

With the magazine chamber 103 less than full, motor 61 oscillates the arm 67 over the track 87 to locate idle answering plugs, their positions being marked by ground on the associated contacts 91. Motor 63 functions to pick up the answering plug and deposit it in the magazine chamber 103 until the latter is sufficiently filled up to cause contacts 105 to open.

When any plug inserted in a jack has become idle by the breaking of the connection between the calling and the called subscriber, the contact 99 associated with the socket 77 of this particular plug is marked and motor M5 displaces the arm 69 over the track 89 toward the empty socket. After the arm has arrived there, the retracting mechanism 251, 252 goes into action under the control of motor 66 to impart traction to the cord 72 connected to the respective plug, thereby withdrawing the latter from its jack. Should such a withdrawal be prevented owing to some mechanical interference, safety device 254, 255 disengages the wheel 251 from the cord and the arm 69 moves onward to the position of the next plug marked for withdrawal. In this manner it will be possible to have the arm 69 test the cords as to the relative case of their withdrawal, and to prevent their entanglement by first effecting the restoration of the readily retractable cords and only thereafter returning to the cords that had to be skipped during any swing of the arm.

*Circuit description*

(Figs. 18–23)

In Fig. 18 the motors, contacts and solenoids referred to in the above description have been illustrated schematically and identified by the same reference numerals as used in the preceding figures. Two answering plugs 71A′, 71A″, with cords 72A′, 72A″, have been shown by way of example, the associated contacts on the tracks 87 and 89 being designated 91′, 91″ and 99A′, 99A″, respectively. Paired with these answering plugs are two calling plugs 71C′, 71C″ with cords 72C′, 72C″, respectively, the associated contacts on the tracks 88 and 89 being designated 95′, 95″ and 99C′, 99C″.

The diagram shown in Figs. 18–22 has been simplified to the extent that all auxiliary circuits for signaling, making busy tests and so forth have been omitted; while such circuits will be provided in practice, they may be completely conventional and any detailed explanation of their operation is unnecessary for an understanding of the invention.

Fig. 18 also shows connections to two jacks 17′, 17″ having tip and ring connectors 182′ and 182″ and 183′, 183″. The associated answering and calling segments, designated 18A, 18C in Fig. 3, have been combined in each case to a single segment 18′, 18″; similarly, the two pairs of grounded brushes 181A, 181C provided on the plug carrier have been combined to two single brushes 181′, 181″. This simplification has been made possible by the elimination of the auxiliary circuits referred to and has been adopted for the sake of greater clarity.

Each cord 72 comprises tip, ring and sleeve conductors respectively indicated by numerals 257, 258, 259 followed by the designation of the cord, e. g. 257A'. The tip, ring, sleeve and segment conductors of the jacks 17' and 17'' are indicated at 260', 261', 262', 263' and 260'', 261'', 262'', and 263'', respectively. Associated with each contact 91, on track 87, is a contact spring 264 which makes contact with the sleeve of a respective answering plug when the latter is retracted into its socket, as illustrated for spring 264' and plug 71A'. Similarly there is associated with each contact 95, on track 88, a contact spring 265 which makes contact with the sleeve of a respective calling plug while the latter is in the socket, as illustrated for plugs 71C', 71C'' and springs 265', 265'', respectively. Springs 264 are permanently connected to their associated contacts while springs 265 are not.

Fig. 18 also shows contacts 266 which are closed when the coupling halves 254, 255 are displaced from normal relative position, and further shows normally closed contacts 267, carried on arm 67, and 268, carried on arm 68. These contacts are temporarily opened by cams 269, 270 carried on the respective sprocket chains 226', 226'' of these arms.

The contacts operated by the horizontal bars 213, 214, designated 217 in the preceding figures, have been indicated at 217' for the right-hand bar 214 and at 217'' for the left-hand bar 213. Only two horizontal commutator segments, 188', and 188'', have been shown in Fig. 18, in addition to a further segment 271 which marks the center channel.

The cord circuit interconnecting the cords 72A' and 72C' is shown in detail in Fig. 19. It comprises a number of relays 272–281 the function of which will be subsequently described. Common to all the cord circuits are five conductors 282, 283, 284, 285 and 286. Conductors 282, 283, 284 lead to a machine ringing circuit 287 while conductors 285, 286 lead to a selector circuit 288 shown diagrammatically in Fig. 20.

Fig. 20 shows two subscriber stations 289', 289'' and the line circuits 290', 290'' associated therewith. Each subscriber station is connected to its line circuit via line wires 291', 292' and 291'', 292''. The line circuit comprises three relays 293', 294', 295' and 293'', 294'', 295'', respectively. Leads 296', 296'' extend from the line circuits to the selector 288, the selector being adapted, in response to digital impulses received from a calling subscriber, to apply a marking potential (ground) to a selected lead 296.

Five conductors 297, 298, 299, 300 and 301 are common to all line circuits 290. Leads 302 are common to some of the line circuits, there being one such lead for all subscriber lines associated with the jacks of a single jack field. Leads 302' and 302'' are connected in the circuits 290' and 290'', respectively.

Fig. 21 shows a group of relays 303 each connected between battery and a respective lead 302. This figure, which represents part of the supervisory circuit, also shows relays 304—315. The remainder of this circuit, shown in Fig. 22, comprises relays 316—327 and 388, a stepping switch 328 having banks 328*a*, 328*b*, and 328*c*, a stepping magnet 329 for this switch, and a release magnet 330 therefor.

There extend from each cord circuit in Fig. 19 a group of seven additional conductors designated 331'–337', and 331''–337''. The conductors 333', 333'' and 337', 337'' are merged (Fig. 18) at 333, 337, respectively, and lead to the supervisory circuit in Fig. 21. Conductors 331', 331'' terminate at contacts 91', 91'' on track 87; conductors 332', 332'' terminate at contacts 99A', 99A'' on track 89; conductors 334', 334'' lead to springs 265', 265''; conductors 335', 335'' terminate at contacts 95', 95'' on track 88; conductors 336', 336'' terminate at contacts 99C', 99C'' on track 89.

The motor leads extending to the supervisory circuit are 338, 339 for motor 61; 340, 341 for motor 62; 342, 343 for motor 65; the solenoids 92, 96, 100 are also connected across these leads, respectively, in parallel with the armatures of their associated motors. Further motor leads are 344 for motors 63, 345 for motor 64; 346, 347 for motor 66; 348 for the auxiliary motor 120, 349, 350 for plug connector motor 130; 351, 352 for vertical motor 40; and 353, 354 for horizontal motor 50.

Leads 355, 356 and 357 terminate at the brushes 90, 94 and 98, respectively. Conductors 358, 359, 360, 361 and 362, 363 extend from the limit switches 81–86, respectively. Each of the contacts 255, 267, 268 has a grounded lead and a lead extending to the supervisory circuit, the latter lead being indicated at 364, 365, 366, respectively.

Other leads extending from the apparatus of Fig. 18 to the supervisory circuit include a conductor 367 leading to the front contact of spring 207; a conductor 368, leading to the "stop right" magnet 191, a conductor 369 leading to the "stop left" magnet 192, and a conductor 370 common to both magnets; a pair of conductors 371, 372 connected to the front and back contacts of the solenoid-operated switch 112, and a similar pair of conductors 373, 374 connected to the front and back contacts of the companion switch 113; two conductors 375, 376 connected to the back and front contacts of spring 206; a conductor 377 extending from the magazine contacts 105; a conductor 378 extending from the vertical stop magnet 48; leads 379', 379'', terminating at segments 188', 188'', respectively. A lead 380 terminating at the center segment 271; and conductors 381, 382 leading to the solenoids 108, 109, respectively.

Five additional conductors lead from the portion of the supervisory circuit shown in Fig. 21 to that shown in Fig. 22. They are a conductor 383, connected to armatures of all 303 relays in parallel; a conductor 384, connected to the front contacts of the left-hand 303 relays; a conductor 385, connected to the front contacts of the right-hand 303 relays; a conductor 386, connected to other front contacts of all 303 relays in parallel; and a conductor 387, connected to armatures of the relays 314, 315 in parallel.

It will also be noted that front contacts of the even-numbered relays 303, such as 303'', are connected in parallel to conductor 369 while front contacts of the odd-numbered relays 303, such as 303', are connected in parallel to conductor 368.

In Fig. 22 the winding of relay 316 is connected between ground and conductor 368, its armatures being connected to conductors 349, 350, respectively. The windings of relays 317, 318 are connected between battery and conductors 386, 300, respectively. Conductor 383 terminates at the No. 3 contact of bank 328*b*; conductor 387 terminates at the No. 1 contact of bank 328*c*. Conductor 367 is connected to the off-normal contacts of bank 328*a*.

Other connections plainly appear on the drawing and will appear from the subsequent description of the operation of these circuits.

*Detailed circuit operation*

In Fig. 18 the plug carrier 20 has been illustrated in a position ready to insert a plug 17A" into a jack 17"; in the associated circuits, however, all relays as well as the selector switch 328 have been shown in their normal or unoperated position, in order to avoid confusion.

At the beginning of this description it shall be assumed that the circuits are completely at rest, with all idle plugs in their sockets, magazine chamber 103 filled up (contacts 105 open, contacts 106 closed), chamber 104 empty (contacts 107 open), and with the plug carrier 20 in its home position (springs 206–209 on their respective front contacts).

Let us assume that a caller at station 289" desires to call up station 289'. When the receiver is lifted from the hook, the latter closes an energizing circuit for relay 294" via wires 291", 292". Relay 294" connects ground to conductor 302", thereby energizing relay 303" in the supervisory circuit (Fig. 21). Relay 294" also interconnects conductors 299 and 301 as well as conductors 300 and 263", the latter leading to the vertical segment 18" associated with the calling subscriber line. Solenoid 108 operates in a circuit that can be traced from battery (Fig. 21), armature and back contact of relay 315, conductor 361, solenoid 108, conductor 299, conductor 301, closed contacts 209, closed contacts 106 to ground; this operation inserts a plug 71A" from chamber 103 into the plug carrier 20. Solenoid 108 also energizes, via make contacts 112 and conductor 371, the relay 315 which looks to spring 206 over lead 376, at the same time opening the operating path for the solenoid. It will be noted that the solenoid would not have operated if either the plug carrier had not been in its home position or no answering plug had been in the magazine.

The release of the solenoid 108 closes a circuit from ground over back contacts 112, conductor 372, front contacts of relay 315, conductor 387, No. 1 contact on bank 328c, wiper 328b, back contact of relay 326, stepping magnet 329 to battery, thereby advancing the switch 328 one step.

With the stepping switch in position No. 2, ground is connected over a back contact of relay 326, wiper 328b and No. 2 contact thereof to the winding of the "down" relay 320 which operates, closing a circuit for the vertical motor 40 from ground, left-hand armature and back contact of the vertical stopping relay 318, conductor 352, lower field winding of motor 40 to battery. Energization of this field winding operates the motor in such a direction as to move the plug carrier 20 downwards to an intermediate position in which spring 206 is actuated, in the manner previously described, to open its upper contacts and to close its lower contacts. Contacts 207, 208 and 209 open at the same time.

Spring 206 now energizes the vertical stopping relay 318 in a circuit from ground (Fig. 18), conductor 375, back contact and armature of relay 325, winding of relay 318 to battery. The operation of this relay opens the energizing circuit for motor 40 and also actuates the vertical stopping magnet 48 (via conductor 378) which, however, performs no useful function at this time. Relay 318 also connects ground to the No. 2 contact on bank 328c, causing the magnet 329 to advance the switch 328 another step.

In the next position of the switch 328, ground is connected over wiper 328b and the No. 3 contact thereof to conductor 383 and thence to the lower armature of each of the relays 303. This ground is extended by the energized relay 303" to conductor 384 and thence to the "left" relay 321 which closes its contacts and energizes the horizontal motor 50 in a circuit leading from ground, left-hand armature and back contact of the horizontal stopping relay 317, conductor 354, left-hand field winding of motor 50 to battery. Energization of this field winding operates the motor in such a direction as to move the carriage 19 towards the left until its brush 190 encounters the segment 188".

In this position of the carriage (which is the one illustrated in Fig. 18) the brush 190 applies ground to the segment 188" and thence, via conductor 379", intermediate armature and front contact of relay 303", conductor 366 to the winding of relay 317, energizing the latter. The operation of this relay opens the energizing circuit for motor 50 and actuates the "stop right" magnet in a circuit extending from ground, conductor 370, magnet 191, conductor 368, upper front contact and armature of relay 303" to battery; thereby the carriage 19 is arrested in such a position that the plug carrier 20 adjoins the jack field on the right of the vertical channel associated with the segment 188".

(If the extreme left-hand relay 303 in Fig. 21 had operated in lieu of relay 303", all previous steps would have been the same except that magnet 192 would have been energized instead of magnet 191, via lead 369, thus arresting the carriage in a position adjacent the left-hand jack fields.)

Relay 317 also connects ground to the No. 3 contact on bank 328c, thereby advancing the switch 328 another step.

In the No. 4 position of switch 328 the "down" relay 320 is again operated in a circuit which is similar to the one previously traced but includes the No. 4 contact of bank 328b, instead of the No. 2 contact thereof. Energization of this relay operates as before to actuate the vertical motor 40 for movement of the plug carrier in a downward direction, this movement ceasing when the grounded brush 181" on the plug carrier engages the segment 18".

The operation of "left" relay 321 in the No. 3 position the switch also caused the energization of relay 325 in a circuit leading from ground, wiper 328a and off-normal contact arc thereof, conductor 367, lower armature and front contact of relay 321, winding of relay 325 to battery. (If the "right" relay 322 had operated instead of relay 321, the result would have been the same.) Relay 325 locks to conductor 367 and opens the aforedescribed energizing circuit for the vertical stopping relay 318. With the plug carrier 20 in the position illustrated in Fig. 18, a new energizing circuit for this relay is closed from ground via brush 181", segment 18", leads 263" and 300 to winding of relay 318. Motor 40 is again deenergized and vertical stop magnet 48 operates to arrest the plug carrier in accurate alignment with the jack 17". At the same time the stepping switch 328 is advanced by ground on the No. 4 contact of its bank 327c.

Next a circuit is closed for the plug connector motor 130 from the battery, right-hand back contact and armature of reversing relay 316, conductor 350, motor 130, conductor 349, left-hand armature and back contact of relay 316, No. 5 contact on bank 328b to ground. The polarity of the current in this circuit is such as to cause the motor 130 to rotate in a direction calculated to transfer the plug 17A" to the waiting jack 17'', the motor immediately thereafter disconnecting itself at contacts 163, for the duration of this cycle of operations, in the manner previously described.

The sleeve contactor of each jack 17 has battery potential from its respective line circuit 290 connected thereto via the winding of its relay 285 and conductor 262. When a plug is inserted, this potential is applied through conductor 259A thereof to the relay 281 of the associated cord circuit (Fig. 19), thus causing the simultaneous operation of both relays. While the cord circuit for plug 71A" is not shown in detail, the following description will be clearly understood by reference to the cord circuit associated with the plug 72A', the two circuits being identical.

The operation of relay 295'' in the calling subscriber circuit 290'' grounds its lead 296'', thereby rendering this circuit busy in well-known manner, and also releases relay 294'', thereby opening the connections between leads 299, 300 on the one hand and leads 301, 263'' on the other. This breaks the energizing circuits for relays 303'' (thus releasing relay 321) and 318, the latter in releasing connecting ground to the No. 5 contact on bank 328c. Switch 328 now steps to position No. 6.

In this position the "up" relay 319 is operated over an obvious circuit including the wiper and the No. 6 contact of bank 328b. A circuit is closed for the upper field winding of motor 40, via conductor 351 and a break contact of relay 318, causing this motor to raise the plug carrier until the latter actuates the stop bar 213, closing contacts 217''. Relay 318 operates in a circuit leading over conductor 300 to ground at contacts 217'', thus stopping motor 40 and energizing magnet 48 which latter, however, performs no useful function at this time. Ground on the No. 6 contact of bank 328c advances the stepping switch to position No. 7.

Relay 388 is energized over contact No. 7 on bank 328b and locks to the lower armature and back contact of relay 326. It also connects ground to the winding of the "right" relay 322 over a back contact and armature of relay 323. Relay 322 closes a circuit for the right-hand field winding of horizontal motor 50, via conductor 353 and a break contact of relay 317, causing the motor to let the carriage 19 travel towards the right until the plug carrier is aligned with the central channel. In this position ground is applied by the brush 190 to center segment 271 and thence over lead 380 and the lower front contact and armature of relay 388 to the winding of horizontal stop relay 317. Relay 317 operates, stops the motor 50 and applies ground to the No. 7 contact of bank 328c, thus advancing the switch to position No. 8.

"Up" relay 319 is now energized over the No. 8 contact of bank 328b, causing the motor 40 to drive the plug carrier upwards. When the carrier reaches its home position, ground from the off-normal arc of bank 328a is extended to the conductor 300 via lead 367 and spring 207, thereby energizing relay 318 which stops the motor 40. The simultaneous energization of magnet 48 performs no useful function.

Relay 318 also connects ground to the No. 8 contact of bank 328c, advancing the stepping switch to position No. 9. In this position ground from the No. 9 contact of bank 328b energizes the relay 327 which operates relay 326, the latter disconnecting ground from the wipers 328b and 328c and energizing the release magnet 330; this causes the stepping switch to return to position 1, relay 327 having locked via off-normal conductor 367 to the arc of bank 328a.

The calling subscriber, having received dial tone over conventional circuits (not shown), dials a desired number of one or more digits. The dial pulses are applied to the selector 288 by way of a circuit which leads from wire 291'' over conductor 260'', tip connector 182'', tip conductor 257A'', upper armature and back contact of relay 276 to conductor 285 and from wire 292'' over conductor 261'', ring connector 183'', ring conductor 258A'', lower armature and back contact of relay 276 to conductor 286. The selector circuit 288 thereupon applies ground to the lead 296' of the selected line circuit 290', resulting in the operation of relay 293'.

Relay 293' connects ground to lead 302', resulting in the energization of relay 303'. It also connects potential from the winding of relay 318 to the segment 18', by interconnecting leads 300 and 263', and interconnects leads 291 and 298. This operation, however, is without effect as long as the magazine chamber 104 is empty, the circuit for the calling solenoid 109 being broken at contacts 107.

If the calling plug 71C'', which is paired with the answering plug 71A'', is in its normal position in the socket 77, its sleeve makes contact with the spring 265'', extending ground from the upper winding of sleeve relay 277 over leads 259C'' and 334'' to the winding of relay 278. Relay 278 operates but relay 277 is incapable of energization in series with the former.

Relay 278 extends the ground from the lowermost front contact of the previously energized relay 281 to conductors 335'' and 337''. Ground on conductor 335'' marks the contact 95'' on bank 88 which is the contact associated with the socket of plug 71C''. Ground on conductor 337'' energizes the motor 62 in a circuit which extends from conductor 337 (the latter being common to all cord circuits) over a back contact of relay 312 (Fig. 21) to the upper armature of relay 313 and via leads 340, 341 and the lower armature of relay 313 to battery. The polarity of the current passing through the armature of motor 62 thus depends on whether or not the relay 313 is operated; in the deenergized condition of this relay, motor 62 operates to swing the arm 68 to the left as viewed in Fig. 18, until the arm closes the limit switch 84 which energizes relay 313 by way of lead 361. Relay 313 then locks to the normally closed limit switch 83 over conductor 360 reversing the swing of the arm 68 until the time when this arm reaches the right-hand end of its path, when limit switch 83 is temporarily opened and releases relay 313.

The oscillation of the arm 68 over the track 88 is, however, interrupted when its brush 94 detects the marked contact 95''. Ground on this contact then energizes the relay 312 over conductor 356, thereby interrupting the operating circuit of motor 62. Solenoid 96, which had operated in parallel with motor 62, releases its plunger which drops into the hole 97 associated with plug 71C''. Relay 312 locks to the cam-operated contacts 268, on arm 68, over lead 366.

The operation of relay 312 energizes motor 64 via lead 345. The motor rotates the chain 226'', causing the bifurcated hook 227 (Fig. 12) thereof to pick up the plug 71C'' and deposit it in the chamber 104 of the magazine 102. This action is assisted by the motor 120 which operates via lead 348 and a front contact of relay 312. At the end of this operation the cam 270 on chain 226'' opens momentarily the contacts 268; this cam has been shown schematically and in practice may be part of the hook 227. The opening of the contacts 268 breaks the holding circuit for relay 312 the main energizing circuit of which had been opened by the release of relay 278 upon withdrawal of the plug 71C'' from its socket.

In the cord circuit (Fig. 19) the relay 279, which had been energized over the lower armature and front contact of relay 281, locks to the lower armature and back contact of relay 278 after the latter releases; relay 279 at its upper armature prepares a holding circuit for the relay 276. Relay 281 has locked over the back contact and armature of relay 280.

The insertion of plug 71C'' into chamber 104 closes the contacts 107 thereof, causing the operation of the calling solenoid 109 in a circuit extending from ground at contacts 107 over closed contacts 208, leads 298, 297, 382 and the lower back contact and armature of relay 314 to battery. Solenoid 109 operates to push the plug 71C'' into the plug carrier 20 and, over contacts 113 and lead 373, energizes the relay 314 which locks to the upper contact of spring 206 via conductor 376. With the operating circuit of solenoid 109 broken at contacts 107 as well as at the back contact of relay 314, switch arm 113 returns to normal and causes the advance of stepping switch 328 (Fig. 22) by closing a circuit from ground, conductor 374, upper front contact and armature of relay 314, conductor 387, No. 1 contact and wiper 328c, back contact and armature of relay 326, stepping magnet 329 to battery.

The stepping switch functions as before to move the plug carrier down to its intermediate position in which spring 206 opens its upper contact, releasing relay 314. In position No. 3 of the switch the "right" relay 322 is energized by ground applied to its lead 385 at the lower armature of the operated relay 303', and motor 59 thereupon moves the carriage 19 toward the right until the brush 190 engages the segment 188'. Horizontal stopping relay 317 then operates via lead 379', second armature and front contact of relay 303', lead 383, thus deactivating motor 59 and energizing "stop left" magnet 192 via conductors 370, 369 and the upper armature and front contact of relay 303'. Relay 316 operates in parallel with magnet 192 over conductor 369.

The energization of "right" relay 322 also closes a circuit for the energization of relay 324 which locks to the lower back contact and armature of relay 326 and prepares an energizing circuit for relay 323.

The stepping switch 328 continues to operate in the manner previously described and in its fifth position energizes the plug connector motor in such manner as to cause the latter to eject the plug 71C'' towards the left, as viewed in Fig. 18, thereby inserting it into the jack 17' associated with the desired subscriber circuit 290'; the current now flows through the armature of this motor with an inverted polarity, owing to the operation of relay 316.

When the plug 71C'' makes contact with the sleeve connector of the jack 17', ground from the upper winding of relay 277 (Fig. 19) is extended over conductors 259C'', 262' to the winding of relay 295' in subscriber circuit 290'. Relay 295' releases relay 293' and grounds the lead 296', thereby making the circuit 290' busy against other calls. The release of relay 293' opens the operating circuits for relays 318 and 303', the latter in turn releasing relays 322 and 316. The release of relay 322 completes the energizing circuit for relay 323 through the upper armature and front contact of the operated relay 324; thus when relay 388 operates in the seventh position of the stepping switch (bar 214 having functioned in the same manner as previously the bar 213), energization of relay 388 results in the operation of "left" relay 321 over front contacts of the two relays 388, 323. The carriage then returns to center position and the plug carrier is driven home in the same manner as before.

In the cord circuit (Fig. 19) the relay 277 has operated in series with relay 295'. Operation of relay 277 energizes relay 276 which through-connects the talking conductors 257A'', 258A'' and 257C'', 258'' by way of the conventional blocking condensers 389, 390. The supervisory relay 275, connected across the tip and ring conductors of the answering cord, operates over the line loop of station 289'' and energizes the slow-releasing relay 274 designed to hold up during receiver flashing. Relay 277 further energizes the ringing relay 272 in a circuit which includes a front contact of relay 276, a back contact of supervisory relay 273, lead 284 and a normally closed contact in the machine ringing circuit 287.

Relay 272 connects the tip and ring conductors of the calling cord to leads 282, 283, respectively, thus causing the circuit 287 to transmit a ringing signal to the line of the called subscriber at station 289'. When the called subscriber answers, closure of the loop 291', 292' energizes a relay in the machine ringing circuit 287, via conductors 260', 257C'', 282, 283, 258C'', 261', which opens the aforesaid contact and deenergizes relay 272. The latter relay in releasing connects the supervisory relay 273 across the line loop of the called subscriber and this relay, in turn, disconnects relay 272 from lead 284.

While the conversation is in progress between the two stations 289' and 289'', any number of additional connections between other subscribers, up to the maximum determined by the number of available cord circuits, may be set up in the manner just described. To this end it is necessary to keep the chamber 103 of magazine 102 supplied with answering plugs, and this is accomplished in the following manner:

With the magazine contacts 105 closed, a circuit is completed for the motor 61 from battery (Fig. 21), lower armature and back contact of reversing relay 310, lead 338, armature of motor 61, lead 339, upper back contact and armature of relay 310, upper back contact and armature of relay 311, lead 377, contacts 105 to ground. (It is assumed that relay 310 is unoperated at this instant.) Motor 61 thereupon swings the arm 67 over the track 87 in a clockwise direction, as viewed in Fig. 18, until the arm closes limit switch 81. Thereupon relay 310 is energized via conductor 358 and locks to limit switch 82 by way of conductor 359, at the same time reversing the direction of rotation of motor 61. The arm 67 now swings counter-clockwise until it opens the limit switch 82, thus releasing the relay 310 and again reversing its direction of travel. Solenoid 92 operates in parallel with motor 61.

If the plug 71A' is in its socket, brush 90 of arm 67 in passing the contact 91' closes a circuit for relay 311 from battery, winding of relay 311, conductor 355, contact spring 264', sleeve conductor 259A', upper winding of sleeve relay 281 to ground; relay 281 is arranged so as not to operate in series with relay 311. The latter opens the circuit for motor 61 and locks to contacts 267 via conductor 365. Solenoid 92 drops its plunger into the nearest hole 93 to align arm 67 with plug 71A'. Motor 63 is energized over conductor 344 and a front contact of relay 311, causing the chain hoist 226' to pick up answering plug 71A', and to deliver it to the chamber 103 of magazine 102, whereupon cam 269 releases relay 311 by momentarily opening the contacts 267. If magazine contacts 105 are still closed, relay 311 in addition to stopping the motor 63 reenergizes motor 61 to continue the sweep of arm 67 in search for further answering plugs. When the chamber 103 is filled up, contact 105 opens and arm 67 comes to rest.

It will be noted that motor 120, operating the oscillatory lever 121, has been energized simultaneously with motor 63 over conductor 148 and the lower front contact of relay 311.

When the calling subscriber (at station 289'') puts down his receiver, thus opening the line loop, the supervisory relay 275 on the answering side releases and, after the subsequent release of relay 274, connects ground from a front contact of relay 276 via front contacts of relay 281 to conductors 332'' and 333'' (333). Ground on conductor 332'' marks the contact 99A'' on track 89 associated with the home socket of plug 71A''. Ground on conductor 333 energizes relay 304 (Fig. 21) to close a circuit for motor 65 via leads 342, 343, reversing contacts of relay 309 and a back contact of relay 305. Relay 309 is energizable over lead 363 and limit switch 86 when the arm 69, displaced by the motor 65, reaches the left-hand end of its travel, and locks to limit switch 85 by way of lead 362. In this manner reversals of the sweep of arm 69 are obtained in similar manner as previously described in connection with arms 67 and 68.

When the brush 98 on arm 69 engages the marked contact 99A'', ground from this contact is extended via conductor 357 and the back contact of relay 308 to the winding of relay 307, resulting in the energization of the latter. Relay 307, in turn, energizes relays 305 and 306, the former breaking the circuit for motor 65 and simultaneously completing an operating circuit for motor 66 over reversing contacts of relay 306 and conductors 346, 347. Solenoid 100, which had been operated in parallel with motor 65, releases its plunger to engage the appropriate recess 101 in track 89.

The polarity of the current passing through the armature of motor 66 is determined by the operated condition of relay 306 in such manner as to cause the rubber-tired wheel 251 (Fig. 10) of arm 69 to approach the cord 72A'' and to exert such traction upon this cord as to withdraw the plug 71A'' from the jack 17'' and to return the plug to its socket. As soon as this has occurred, ground from the upper winding of sleeve relay 281 is extended via leads 259A'', 331'' and a front contact of relay 281 to the winding of relay 280 which opens the holding circuit for relay 281; the latter, being unable to hold up in series with winding 280, falls back and releases relay 280 at the same time.

The release of relay 281 removes ground from conductors 333'' and 332'', thereby also from conductor 357. Relays 306 and 307 are restored to unoperated condition but relay 305 holds up for a brief interval, being slightly slow-releasing. During this interval the rotation of motor 66 is reversed by the contacts of relay 306, the motor thus withdrawing the wheel 251 from the cord 72A'' in the manner previously described.

The removal of ground from conductor 333'' at a front contact of the answering sleeve relay 281 does not, however, necessarily result in the deenergization of relay 304 since other cord circuits may ground the common lead 333. Similarly, this lead will be grounded over contacts of the calling sleeve relay 277 for the purpose of withdrawing the calling plug when the called subscriber replaces his receiver. Two alternatives are possible.

I. The called subscriber hangs up after the calling subscriber. Supervisory relay 273 releases and at its lower armature connects ground from back contacts of deenergized relays 280 and 281 over front contacts of the still operated relays 279 and 277 to conductors 333'' (333) and 336''. Ground on the latter conductor marks the contact 99C'' associated with the home position of calling plug 71C''. Ground on conductor 333 again energizes relay 304, resulting in the operation of motor 65 which again causes the arm 69 to hunt for the marked contact on the track 89, whereupon motor 66 goes into action to withdraw the calling plug from jack 17'. When the plug 71C'' has been returned to its socket, contact between the plug and the spring energizes the relay 278 in a circuit which includes conductors 334'' and 259C'' as well as the upper winding of sleeve relay 277. Operation of relay 278 breaks the holding circuit of relay 277 which is unable to hold up in series with the former, yet relay 278 remains energized until the plug 71C'' is again withdrawn from its socket. With the holding circuit of relay 279 open at the lower armature of relay 278, relay 279 likewise releases.

II. The called subscriber hangs up before the calling subscriber. With relays 279 and 277 operated as before, ground is connected to conductors 333'' and 336'' over the lower front contact of relay 274, which has not yet released, as soon as the supervisory relay 373 returns to normal condition. Motors 65 and 66 function as before, and relay 278 is energized when the plug 71C'' is returned to its socket, thus breaking the circuits of relays 277 and 279.

If many cords are connected in an interwoven fashion, it may happen that a cord does not readily yield to the retractile efforts of the pull-down mechanism carried on the arm 69, so that further strain might result in rupture of its conductors or physical damage to the system. As a safety feature, therefore, the switch 266 has been designed to cooperate with the coupling 254, 255 in such manner that any excessive torque cams the inner one of the contact springs of this switch out of the notch provided in the coupling half 254, in which this spring normally rests, thereby causing the spring to engage its companion spring, closing the contacts 266. The following operations result from this closure:

In the supervisory circuit the relay 308 (Fig. 21) is energized via conductors 364 and removes from the winding of relay 307 the ground which is assumed to have been connected to conductor 357, in the manner previously described. Relay 307 in releasing deenergizes relays 306 and 305, the latter, however, holding up for a brief interval to reverse the direction of rotation of motor 66 and thereby withdraw the wheel 251 from the unyielding cord. Such a reversal of rotation tends to allow the inner contact spring of safety switch 236 to enter its notch in coupling half 254, hence the release time of relay 308 is made greater than that of relay 305 so that the latter relay has an opportunity to close the operating circuit for motor 65, thereby swinging the arm 69 away from the trouble spot and toward the next marked contact 99 whereupon new ground will be connected to lead 257, operating motor 66.

When the pull-down mechanism of arm 69 again engages the same cord on the return sweep of the arm, there exists the possibility that the cord will now yield readily, owing to the intervening restoration of other cords which may have crossed its path. If not, the same attempt will be made during each sweep of the arm, and it will be seen that such jamming of a particular cord does not materially interfere with the orderly operation of the rest of the system.

While the invention has been described with reference to a specific, now preferred embodiment as shown in the drawing, it is to be distinctly understood that the description thereof has been given merely by way of illustration and not as a limitation upon the spirit and scope of the invention. The invention is, on the contrary capable of numerous modifications and adaptations which will be readily apparent to those skilled in the art; for example, the plug carrier need not execute two orthogonal movements but may have a linear and a circular path of displacement, with the jack fields disposed on one or on several concentric cylinder surfaces. It is, therefore, intended to encompass within the scope of the invention all such modifications and adaptations as fairly fall within the limits of the appended claims.

What is claimed is:

1. In a communication system, in combination, a plurality of outgoing lines, a plurality of jacks each connected to a respective one of said outgoing lines, an incoming line, a flexible cord connected to said line, a plug connected to said cord, mechanism operable to move said plug into and out of any of said jacks, first electrical control means responsive to selection-indicating signals received over said incoming line for operating said mechanism to insert said plug into a selected one of said jacks, and second electrical control means responsive to a predetermined circuit condition on said incoming line for operating said mechanism to withdraw said plug from the jack engaged thereby.

2. In a communication system, the combination according to claim 1 wherein each of said jacks is open sideways to permit lateral insertion of said plug, said mechanism including plug connector means adapted to execute a selecting movement to place the plug alongside a selected jack and a transfer movement normal to the direction of said selecting movement to insert the plug into the jack.

3. In a communication system, the combination according to claim 2, comprising at least two supports for said jacks forming a channel between them, said plug connector means comprising a plug carrier displaceable within said channel and pusher means carried on said plug carrier, said pusher means being selectively operable by said first electrical control means to eject said plug from the plug carrier in opposite directions for insertion into jacks provided on either of said supports, respectively.

4. In a communication system, the combination according to claim 3, comprising a plurality of supports for said jacks forming a plurality of channels between them, said plug connector means further comprising a carriage displaceable by said first electrical control means in a direction transverse to said channels, said plug carrier being movably supported on said carriage.

5. In a communication system, in combination, a plurality of outgoing lines, a plurality of jacks each connected to a respective one of said outgoing lines, a plurality of incoming lines, a plurality of plugs, circuit means for connecting any one of said plugs to any one of said incoming lines, said circuit means including a plurality of flexible cords each attached to a respective plug, a plurality of sockets, one for each plug, a movable plug carrier, a stationary plug magazine, conveyor means operable to transfer any one of said plugs from its socket to said magazine, first electrical control means responsive to a predetermined condition on any one of said incoming lines to operate said conveyor means for transferring the plug connected to said one line to the magazine, loading means adjacent said magazine for transferring a plug, delivered to said magazine by said conveyor means, from the magazine to said plug carrier when the latter is in a normal position adjacent said magazine, mechanism operable to effect displacement of said plug carrier such as to align a plug, placed on the plug carrier by said loading means, with any one of said jacks, and to return the plug carrier to said normal position, plug connector means on said plug carrier adapted to insert a plug from said carrier into a jack aligned therewith, second electrical control means responsive to selection-indicating signals received over said one incoming line to operate said mechanism in such manner as to align a plug on said plug carrier with a jack connected to a selected outgoing line, third electrical control means responsive to the alignment of said plug with a selected jack to actuate said plug connector means and thereafter to operate said mechanism to return the plug carrier to said normal position, disconnect means operable to disengage any plug from any jack and to return said plug to its socket, and fourth electrical control means responsive to another predetermined circuit condition on said one incoming line to operate said disconnect means to return the plug connected to said one line to its socket.

6. In a communication system, the combination according to claim 5, comprising supporting means having said jacks mounted thereon in a plurality of rows, said mechanism including a carriage movable in a direction transverse to said rows, a first motor for moving the carriage, and a second motor for moving the plug carrier on said carriage in the direction of said rows.

7. In a communication system, the combination according to claim 6 wherein said supporting means comprise a plurality of spaced supports forming a plurality of channels between them, each of said channels having a row of jacks on each side thereof, said jacks being open towards the channel, said plug connector means being selectively actuatable by said second and third electrical control means combined to eject a plug on the plug carrier towards either side of a channel.

8. In a communication system, the combination according to claim 7 wherein said jacks are open sideways to receive a plug by movement parallel to itself, said plug connector means comprising a pusher member and a reversible motor operatively connected with the pusher member for moving the latter in either of two directions.

9. In a communication system, the combination according to claim 5, comprising supporting means having said jacks mounted thereon on at least one row, said mechanism including a motor for moving said plug carrier past said row of jacks, and stop means for arresting the plug carrier adjacent a selected jack of said row, said stop means including switch means actuatable by said second electrical control means to deactivate said motor in a selected position of the plug carrier.

10. In a communication system, the combination according to claim 9 wherein said stop means further include a mechanical stopping device selectively operable by said second electrical control means to arrest the plug carrier in one of a plurality of predetermined stopping positions, each of said stopping positions being adjacent a respective jack.

11. In a communication system, in combination, a plurality of lines, a plurality of jacks each connected to a respective one of said lines, a plurality of pairs of plugs each consisting of an answering plug and a calling plug, a plurality of cord circuits each interconnecting the plugs of a respective pair, each cord circuit including an answering cord attached to the answering plug and a calling cord attached to the calling plug of the pair, a movable plug carrier, a plurality of seats, one for each plug, delivery means operable to move any plug from its seat to said plug carrier, mechanism operable to displace said plug carrier in such manner as to bring a plug carried thereon into alignment with any one of said jacks, plug connector means on said plug carrier adapted to insert a plug carried on said carrier into a jack aligned therewith, disconnect means operable to disconnect any plug from the jack engaged thereby and to return said plug to its seat, and a supervisory circuit common to all of said cord circuits and lines, said supervisory circuit including first control means responsive to a call signal received over any one of said lines to mark the jack connected to said one line and operate said delivery means in such manner as to place an answering plug on said plug carrier, second control means responsive to the placing of an answering plug on said plug carrier to operate said mechanism in such manner as to align the plug on said plug carrier with the marked jack and to actuate said plug connector means for inserting the plug into said marked jack, third control means responsive to the insertion of the plug into said jack to operate said delivery means in such manner as to place the calling plug paired with said answering plug on said plug carrier, fourth control means responsive to selection-indicating signals received over said one line to operate said mechanism in such manner as to align the calling plug on said plug carrier with a jack connected to a selected line and to actuate said plug connector means for inserting the plug into the selected jack, whereby said one line and said selected line are interconnected by way of the cord circuit associated with said answering plug and with said calling plug, and fifth control means responsive to a predetermined circuit condition in said cord circuit, indicative of the breaking of the connection at either of the two interconnected lines, to operate said disconnect means to restore both said answering plug and said calling plug to their respective seats.

12. In a communication system, the combination according to claim 11 wherein said delivery means comprise a stationary plug magazine, conveyor means adapted to move any plug from its seat to said magazine, and loading means adjacent said magazine adapted to transfer a plug from the magazine to said plug carrier when the latter is in a normal position adjacent the magazine, said second control means being responsive to the insertion of any plug into any jack to operate said mechanism to return the plug carrier to said normal position.

13. In a communication system, the combination according to claim 12 wherein said magazine includes a first and a second chamber, said conveyor means comprising a first pick-up device adapted to deliver answering plugs to said first chamber and a second pick-up device adapted to deliver calling plugs to said second chamber.

14. In a communication system, the combination according to claim 13, further comprising switch means in said first chamber positioned to detect the presence of a predetermined number of answering plugs in said first chamber, and additional control means in said supervisory circuit actuatable by said switch means to operate said first pick-up device when said first chamber contains less than said predetermined number of answering plugs.

15. In a communication system, the combination according to claim 11 wherein said disconnect means comprises a pull-down device adapted frictionally to engage any cord attached to a plug to be withdrawn from its jack, and drive means for energizing said pull-down device.

16. In a communication system, the combination according to claim 15, comprising safety clutch means inserted between said pull-down device and said drive means for preventing the application of excessive traction to any cord by said pull-down device.

17. In a communication system, the combination according to claim 16, further comprising a control switch actuatable by said safety clutch means to modify the operation of said fifth control means so as to disengage said pull-down device from a cord requiring an excessive amount of traction for the withdrawal of the plug connected thereto.

18. In a communication system, the combination, with a plurality of answering plugs, a plurality of calling plugs, a plurality of jacks, and means including a movable plug carrier for inserting any of said plugs into any of said jacks, of a stationary magazine having a first and second chamber, conveyor means for delivering answering plugs to said first chamber and calling plugs to said second chamber, and loading means operable to transfer a plug from either of said chambers into the plug carrier when the latter is in a position adjacent the magazine.

19. In a communication system, the combination according to claim 18 wherein each of said chambers is provided with an inclined wing adapted to receive plugs from said conveyor means, said wing having a slot extending toward the respective chamber, a movable finger in said slot projecting above the surface of said wing, and drive means for oscillating said finger along said slot, the projecting end of said finger being shaped so as to pass readily underneath a plug when moving away from the chamber and to push the plug into the chamber when moving toward the latter.

20. In a communication system, the combination according to claim 18 wherein said chambers are spaced apart to provide a channel between them and are open at their bottom towards said channel, the plug carrier being provided with a plug holder portion adapted to enter said channel and open at both sides to receive answering and calling plugs.

21. In a communication system, the combination, with a plurality of jacks and a plug selectively insertable into any of said jacks, of a movable plug carrier provided with a holder adapted resiliently to retain a plug, a pusher member for dislodging the plug from said holder for insertion into a jack, a plug connector motor supported on said plug carrier and connected with said pusher member for operating the latter, and an energizing circuit for said motor.

22. In a communication system, the combination according to claim 21 wherein said plug carrier is provided with switch means positioned to be operated by said motor after one cycle of movement of said pusher member for breaking said energizing circuit.

23. In a communication system, the combination according to claim 22, further comprising mechanism for returning the plug carrier to a home position after the dislodgement of the plug by the pusher member, and stationary cam means effective upon return of the plug carrier to said home position to inactivate said switch means.

24. In a communication system, the combination, with a row of jacks, a movable plug carrier displaceable along said row for aligning a plug on said carrier with a selected one of said jacks preparatory to insertion of the plug into the selected jack, and drive means for displacing the plug carrier, of stop means for arresting the plug carrier in a selected position of alignment, said stopping means comprising a plurality of stationary contacts adjacent respective ones of said jacks, circuit means for applying marking potential to a selected one of said stationary contacts, a movable contact mounted on said plug carrier, switch means operative upon engagement of said marked contact by said movable contact to deenergize said drive means, and a mechanical stopping device actuatable by said switch means to prevent movement of the plug carrier beyond the selected position.

25. In a communication system, the combination according to claim 24 wherein said mechanical stopping device comprises lug means projecting from said plug carrier, an elongated member positioned along the path of the plug carrier, said member being provided with special formations adapted to cooperate with said lug means to arrest the plug carrier, and electromagnetic tripping means for effecting engagement of said member by said lug means.

26. In a communication system, the combination according to claim 25 wherein said jacks are arranged in pairs, each pair being provided with a single stationary contact common to both jacks thereof, said mechanical stopping device comprising a second elongated member provided with spaced formations similar to those on the first member and adapted to cooperate with said lug means, circuit means for selectively operating said tripping means, to effect engagement of said first member with said lug means for aligning the plug with the first jack of any pair and to effect engagement of said second member with said lug means for aligning the plug with the second jack of any pair.

27. In a communication system the combination, with a movable plug carrier, of plug carrier moving means, a plug and means for inserting said plug into a jack, a plurality of jacks positioned alongside the path of movement of said plug carrier, each of said jacks comprising a plurality of spring clips open on the side to receive said plug, carried on said plug carrier, by sideways insertion into the jack.

28. In a communication system, the combination according to claim 26, comprising a plug having a flexible cord attached thereto, said plug fitting into any one of said jacks, pull-down mechanism including a friction roller to exert traction upon said cord for removing said plug from a jack, and deflector means adjacent said jacks for laterally deflecting the pull of said cord, thereby facilitating withdrawal of the plug from the jack.

29. In a communication system, in combination, a plug magazine, an arm pivoted adjacent said magazine, an arcuate plug support forming sockets for a plurality of plugs, said arm being adapted to sweep over said support, first drive means for oscillating said arm over support, pick-up mechanism on said arm operable to engage a plug on its support and to deliver the plug to said magazine, and second drive means for operating said pick-up mechanism.

30. In a communication system, the combination according to claim 29 wherein said sockets are formed by respective openings provided in said support, comprising a plurality of flexible cords passing freely through said openings, respectively, a plurality of plugs each attached to a respective one of said cords, a plurality of cord circuits each connected to a respective one of said plugs through the intermediary of the respective cord, a set of stationary contacts each engageable by a respective plug when the latter is in its socket, circuit means for energizing said first drive means, and switch means in each cord circuit connected to a respective one of said stationary contacts, said switch means being responsive to the presence of a plug in its socket to arrest said arm in line with said plug and to energize said second drive means for delivering said plug to said magazine.

31. In a communication system, the combination according to claim 29, comprising a plurality of stationary contacts adjacent respective ones of said sockets, energizing means for said first drive means, a movable contact on said arm, circuit means for selectively applying a marking potential to any of said stationary contacts, and switch means connected to said movable contact, said switch means being responsive to engagement of a marked stationary contact by said movable contact to deenergize said drive means, thereby arresting said arm in line with the marked contact.

32. In a communication system, the combination according to claim 31, comprising a solenoid provided with a plunger and connected to said energizing means for energization simultaneously with said first drive means, said plug support being formed with a plurality of recesses engageable by said plunger, upon deenergization of the solenoid, for accurately aligning said arm with said marked contact.

33. In a communication system, in combination, a plurality of jacks, a plurality of plugs having flexible cords attached thereto, an arcuate plug support provided with a plurality of openings forming respective sockets for said plugs, each cord passing freely through a respective one of said openings, a movable arm pivoted substantially at the center of curvature of said support, a rotatable member journaled on said arm for frictional engagement with any cord on the side of said support remote from said jacks, mechanism for swinging said arm into alignment with any cord having its plug inserted into any of said jacks, and drive means for rotating said rotatable member in such a sense as to withdraw the plug of a cord engaged thereby into its respective socket.

34. In a communication system, the combination according to claim 33 wherein said rotatable member comprises a rubber-tired wheel.

35. In a communication system, the combination according to claim 33 wherein said drive means include a train of gears including a driving gear, having a gear shaft journaled in said arm and a driven gear, a supporting member pivoted on said arm coaxially with said driving gear, said driven gear and said rotatable member being journaled on said supporting member, and friction means tending to impede the rotation of said driven gear relative to said supporting member, whereby rotation of said driving gear will tend to swing said supporting member about said gear shaft before imparting rotation to said driven gear and to said rotatable member, said rotatable member being coupled to said driven gear in such manner that rotation of the driving gear in a sense enabling said rotatable member to withdraw a plug from its jack will first swing said supporting member and, with it, said rotatable member toward the respective cord.

36. In a communication system, the combination according to claim 35 wherein said drive means further include a motor and circuit means for energizing said motor for rotation in a sense to enable said rotatable member to withdraw a plug from its jack, further comprising contact means positioned adjacent each socket for engagement by the respective plug, and switch means connected to said contact means, said switch means being responsive to the return of a plug to its socket for reversing the sense of rotation of said motor, thereby withdrawing said rotatable member from the associated cord.

37. In a communication system, the combination according to claim 36 wherein said drive means further include two frictionally coupled clutch members inserted between said motor and said train of gears, yieldable means tending to maintain said clutch members in a normal relative position, and contacts operable by said clutch members upon displacement from said normal relative position to reverse the direction of rotation of said motor.

38. In a communication system, the combination according to claim 33 wherein said mechanism comprises a motor, an energizing circuit for said motor, circuit means for selectively breaking said energizing circuit to arrest said arm in line with the cord of a plug to be withdrawn, and a solenoid provided with a plunger and connected in said energizing circuit for energization simultaneously with said motor, said plug support being formed with a plurality of recesses engageable by said plunger, upon deenergization of the solenoid, for accurately aligning said arm with the said cord.

39. In a mechanical communication switching system, a switchboard having jacks connected to lines, a mechanical cord circuit having an answering plug and a calling plug, a displaceable plug carrier, a first electric switching circuit control for said carrier, said control including first electromechanical instrumentalities for connecting said answering plug to a calling line at a first time, and a second electric switching circuit control for said carrier, said second control including second electromechanical instrumentalities for connecting said calling plug to a calling line at a second time.

40. In a mechanical communication system, a cord circuit having an answering plug connected to an answering cord and a calling plug connected to a calling cord, a plurality of answering jacks and a plurality of calling jacks, and a single plug conveyor for first conveying said answering plug to a selected one of said answering jack and then conveying said calling plug to a selected one of said calling jack.

41. A mechanical communication switchboard having a bank of jacks, a displaceable selecting mechanism on one side of said bank, a chain conveyor and a plurality of flexible connectors on the other side of said bank and means including said mechanism and said conveyor for transporting said connectors to selected jacks.

42. In a mechanical communication switchboard, a mechanical cord circuit having a flexible cord connected to a plug, a bank of terminals, a plug seat for said plug, a plug storage magazine, a first plug conveyor for conveying said plug from said seat to said magazine, and a second plug conveyor for conveying said plug from said magazine to said terminals.

43. In a mechanical communication switchboard, a plurality of mechanical cord circuits, an answering plug connected to an answering cord and a calling plug connected to a calling cord in each of said circuits, normal positions of rest for said plugs, an answering plug storage magazine, a calling plug magazine, an answering plug conveyor for conveying said answering cords from their positions of rest to said answering plug magazine, and a calling plug conveyor for conveying said calling plugs from their positions of rest to said calling plug magazine.

44. In a communication switchboard, a cord circuit having a plug ended flexible answering cord and a plug ended flexible calling cord, a plurality of sets of calling terminals and a plurality of sets of called terminals in said board and a single mechanical conveyor for moving said plugs to engage said terminals so as to selectively interconnect said terminals.

45. In a communication switching system, a mechanical switchboard for interconnecting calling and called lines, said switchboard comprising a first plurality of jacks for terminating incoming lines and a second plurality of jacks for terminating outgoing lines, a plurality of plug ended answering cords, a plurality of plug ended calling cords, each of said answering cords having an individual connection to a corresponding one of said calling cords, a plug carrier mechanism, a plug carrier displacing mechanism, electromagnetic control circuits for said mechanisms responsive to a call incoming to one of said first plurality of jacks for connecting a plug connected to a selected one of said answering cords to said one jack, and other electromagnetic control circuits for said mechanisms responsive to the reception of code signals designating the called jack for connecting the plug connected to the calling cord associated with the selected answering cord to the called jack.

46. In a communication switching system, a mechanical cord circuit, an answering cord and a calling cord in said circuits, a calling jack and a called jack, a displaceable cord carrier, instrumentalities including a first cord magazine, an electric motor and a solenoid for depositing said calling cord in said carrier at a first time, a motor-driven transfer device in said carrier, and a motor control therefor, for connecting said cord to said calling jack, and other instrumentalities including a second cord magazine, said motor and said solenoid for depositing said calling cord in said carrier at a second time and said motor-driven transfer device and another commutator control therefor for connecting said calling cord to said called line.

47. In a mechanical communication switching system, a plug seat, a plurality of cord circuits each equipped with a flexible cord, each of said cords terminated in an individual plug, said plugs supported in said seat, a single plug conveyor, said conveyor serving all of said cords and plugs, said conveyor normally spaced from said plugs, electromechanical means in said cord circuit cooperating with other electromechanical means in said conveyor for identifying an idle plug and cord, electromagnetic selecting means connected to said conveyor for selecting a plug and cord identified as idle and motor controlled finger means connected to said conveyor responsive to said selection, for thereupon clutching said plug and withdrawing it from said seat.

48. In a mechanical communication system, a bank of jacks having a plurality of rows of jacks, individual communication channels connected to each of said jacks, a plurality of cord circuits, each of said cord circuits having a flexible answering cord terminated in an answering plug, and a flexible calling cord terminated in a calling plug, a plug seat for supporting said plugs, and a motor controlled conveyor for clutching any one of said plugs and drawing its connected cord through said seat toward said bank.

49. In a communication system, a single bank of jacks having a plurality of jacks arranged in a single row and a plurality of rows, a plurality of communication channels connected individually to said jacks, a plurality of cord circuits each equipped with a flexible cord, said flexible cord terminated in a plug, each of said plugs connectable to any of said jacks, a single plug carrier common to all of said plugs, said carrier normally spaced from said plugs and said jacks, plug carrier displacement means, including an electric motor, electromagnetic selecting means for selecting a particular idle plug and cord, and control means responsive to said selecting means for moving said selected plug and cord toward said jack bank through said displacement means.

50. In a mechanical communication system, a single bank of jacks having a plurality of rows of jacks, individual communication channels connected to each of said jacks, a plurality of cord circuits, each of said cord circuits having a flexible answering cord, an individual answering plug attached to each said answering cord, an individual flexible calling cord paired with each said answering cord and connected respectively to each said cord circuit, an individual calling plug attached to each said calling cord, a plug seat spaced from said bank, each of said plugs supported in an individual opening in said seat, a single answering plug conveyor common to all of said answering plugs, electromagnetic selecting means connected to said conveyor for selecting an idle answering plug, plug coupling means in said conveyor, a control for said coupling means responsive to said selecting means, for drawing said idle plug from its seat and transporting said idle plug and its attached cord toward said bank, other identifying means for subsequently identifying the calling plug paired with said idle answering plug, other plug coupling means for drawing said identified calling plug toward said bank, and a plug actuator for inserting said answering plug in the jack of a calling channel and inserting said calling plug in the jack of a called channel, said jack of said calling channel and said jack of said called channel both in said single bank.

51. In a mechanical communication switching system, a cord circuit having a flexible cord, an idle indicating contact means in said circuit, electromechanical cord transportation means spaced from said cord, a cord coupler in said transportation means, and a control for said coupler responsive to said idle indicating means for coupling said cord to said transportation means.

52. In a mechanical communication switching system, a cord circuit having a flexible cord, a normal position of rest when idle for said cord, a position of preselection for said cord, an idle indicating feature in said cord circuit, and an electromechanical conveyor and circuit control means for said conveyor responsive to said indicating feature for transporting said cord from said normal position to said preselection position.

53. In a mechanical communication system, a bank of jacks, a plurality of cord circuits, a plurality of pairs of plugs each pair individually connected to a respective one of said cord circuits, positions of rest for said plugs spaced from said bank and a two-stage electromechanical transportation system for each of said plugs, said first stage from said position of rest to a transfer position, said second stage from said transfer position to a jack in said bank.

WARREN W. CARPENTER.
PAUL B. MURPHY.

REFERENCES CITED

The following references are of record in the file of this patent:

UNITED STATES PATENTS

| Number | Name | Date |
|---|---|---|
| 2,139,249 | Welch | Dec. 6, 1938 |
| 2,242,397 | Kater | May 20, 1941 |
| 2,259,103 | Drake | Oct. 14, 1941 |
| 2,315,010 | Ostline | Mar. 30, 1943 |

OTHER REFERENCES

Automatic Telephone System, vol. 3, 1924, pages 248–254, by William Aitken, Ernest Benn.